US012583156B2

(12) United States Patent
Kato et al.

(10) Patent No.: US 12,583,156 B2
(45) Date of Patent: Mar. 24, 2026

(54) INJECTION MOLDING MACHINE

(71) Applicant: NISSEI PLASTIC INDUSTRIAL CO., LTD., Hanishina-gun (JP)

(72) Inventors: Toshimi Kato, Hanishina-gun (JP); Hirofumi Murata, Hanishina-gun (JP); Hozumi Yoda, Hanishina-gun (JP)

(73) Assignee: NISSEI PLASTIC INDUSTRIAL CO., LTD., Hanishina-Gun (JP)

( * ) Notice: Subject to any disclaimer, the term of this patent is extended or adjusted under 35 U.S.C. 154(b) by 277 days.

(21) Appl. No.: 18/026,078

(22) PCT Filed: Sep. 14, 2021

(86) PCT No.: PCT/JP2021/033653
§ 371 (c)(1),
(2) Date: Mar. 13, 2023

(87) PCT Pub. No.: WO2022/054958
PCT Pub. Date: Mar. 17, 2022

(65) Prior Publication Data
US 2023/0364841 A1 Nov. 16, 2023

(30) Foreign Application Priority Data

Sep. 14, 2020 (JP) ................................ 2020-153482
Oct. 2, 2020 (JP) ................................ 2020-167970

(51) Int. Cl.
*B29C 45/76* (2006.01)
*B29C 45/52* (2006.01)
(Continued)

(52) U.S. Cl.
CPC ...... *B29C 45/52* (2013.01); *B29C 2045/1762* (2013.01); *B29C 2045/185* (2013.01); *B29C 45/76* (2013.01)

(58) Field of Classification Search
CPC ....... B29C 45/18; B29C 45/185; B29C 45/52; B29C 45/76; B29C 45/766;
(Continued)

(56) References Cited

U.S. PATENT DOCUMENTS

2006/0278014 A1* 12/2006 Okada ..................... B29C 45/76
73/824
2008/0150181 A1* 6/2008 Maruyama ............ B29C 45/766
264/40.7
2012/0146260 A1 6/2012 Murata et al.

FOREIGN PATENT DOCUMENTS

JP 60-135224 A 7/1985
JP 3-36819 U 4/1991
(Continued)

OTHER PUBLICATIONS

International Search Report for PCT/JP2021/033653 (PCT/ISA/210) mailed on Nov. 16, 2021.

*Primary Examiner* — Thu Khanh T. Nguyen
(74) *Attorney, Agent, or Firm* — Birch, Stewart, Kolasch & Birch, LLP

(57) ABSTRACT

A partial reflux injection function part 5 is provided according to which resin R at the front side of a screw head portion 4s is injected into the metal mold 2 to fill the metal mold 2 with the resin R in synchronization with the refluxing of a predetermined amount of the reflux resin Rm to be used as a part of the resin R to the screw body part 4m side at the rear side of the screw head portion 4s through the inner side of the screw head portion 4s and/or the outer periphery side of the screw head portion 4s. A control function is provided that sequentially performs a plasticization step Wi1 to rotate the screw 4 in the heating cylinder 3 to thereby subject the resin in the heating cylinder 3 to a plasticization processing; an injection step Wi2 to allow, after the completion of the plasticization step Wi1, the screw 4 to move forward to
(Continued)

thereby inject, into the metal mold 2, a part of the plasticized resin R accumulated at the front side of the screw head portion 4s of the screw 4 to fill the metal mold 2 with the resin; and a plasticization promotion step Wi3 to allow, after the completion of the injection step Wi2, a part of the remaining part of the accumulated plasticized resin R to be refluxed as the reflux resin Rm to the rear side of the screw head portion 4s.

14 Claims, 14 Drawing Sheets

(51) Int. Cl.
  *B29C 45/17*          (2006.01)
  *B29C 45/18*          (2006.01)

(58) Field of Classification Search
  CPC ...... B29C 2945/76; B29C 2945/76003; B29C
        2945/76083; B29C 2945/76107; B29C
        2945/76177; B29C 2945/76187; B29C
        2045/176; B29C 2045/1762; B29C
        2045/185
  See application file for complete search history.

(56)                References Cited

FOREIGN PATENT DOCUMENTS

| | | |
|---|---|---|
| JP | 5-138703 A | 6/1993 |
| JP | 2010-173183 A | 8/2010 |
| WO | WO2011/161899 A1 | 12/2011 |

* cited by examiner

VALVE CIRCUIT    3 7

INJECTION MOLDING MACHINE

CROSS-REFERENCE TO RELATED APPLICATIONS

This application is the National Phase of PCT International Application No. PCT/JP2021/033653 filed on Sep. 14, 2021, which claims the benefit under 35 U.S.C. § 119(a) to Patent Application Nos. 2020-167970 and 2020-153482, filed in Japan on Oct. 2, 2020 and Sep. 14, 2020, respectively, which is hereby expressly incorporated by reference into the present application.

BACKGROUND

Technical Field

The present invention relates to an injection molding machine to inject resin into a metal mold clamped with a predetermined clamping force to fill the mold with the resin for a molding purpose.

Discussion of the Related Art

Conventionally, an injection molding machine has been widely known according to which resin is injected by an injection apparatus at a predetermined injection pressure to a metal mold consisting of a stationary mold and a movable mold clamped by a clamping apparatus with a predetermined clamping force to fill the mold with the resin for a molding purpose. On the other hand, the applicant has already suggested such an injection molding machine having a specific molding mode using a new molding method different from a molding mode using a general molding method (i.e., a molding mode in which resin is measured at the injection apparatus side and the measured resin is injected to a metal mold at the clamping apparatus side in which a movable mold and a stationary mold are provided at fixed positions to perform a molding operation). This injection molding machine is disclosed in Patent Publication 1.

This injection molding machine has purposes of: providing molded items having a high quality and uniformity even with low viscosity resin having a characteristic sensitive to and easily influenced by a temperature and/or a pressure for example; providing molding conditions that are simpler and that can be set easily and achieving a simpler way of the quality control; and providing a shorter molding cycle time to thereby improve the mass productivity and profitability. Specifically, such a clamping apparatus is used that provides the natural compression of resin at least in accordance with the solidification of the resin in the metal mold. A molding injection pressure and a molding clamping force are calculated and set in advance so as to cause a predetermined mold clearance between the movable mold and the stationary mold during injection and filling and to realize a non-defective molding operation. During production, the molding clamping force is used to clamp the clamping apparatus and the molding injection pressure is set as a limiter pressure. The injection apparatus is driven to perform the injection molding of resin into the metal mold.

Patent Publication 1: International Publication WO2011/161899

SUMMARY OF THE INVENTION

However, the following disadvantage has been left unsolved in the case of the conventional injection molding machine including the injection molding machine including the specific molding mode described above.

Specifically, molded items are produced by an injection molding machine generally based on various molding conditions such as an injection speed, an injection pressure, and/or a resin temperature set to match the type of the molded items for example. However, some of the resultant molded items can more easily have molding defects depending on the type of the molded items in particular. For example, a molding defect is easily caused with a declined yield rate (non-defective rate) particularly in the case of high-cycle molded items having a short plasticization time to suppress sufficient heat from being transmitted to resin; molded items using a recycled pellet material that tends to cause, due to pulverized material mixed therewith for example, a nonuniform pellet shape compared with general pellets; and molded items with a high injection capacity requiring a high capacity plasticization at one time for example.

Thus, this has been conventionally handled by a high precision setting or a stable control for example to various molding conditions. For example, in the case of a plasticization processing of resin, this has been handled by a high precision setting of a heating temperature and/or the optimization of a screw rotation speed and a plasticization time for example. Even if such a handling was sufficient, there has been a significant number of molding defects in actual production sites with an unclear cause of the defects, thus showing a limitation on a high yield rate.

The above failure to provide a high yield rate in particular causes, in the production of large molded items and special resin molded items for example, a lower production efficiency and/or an increased production cost as well as a resource loss and/or a wasteful energy consumption. Thus, a new injection molding machine has been desired in order to further improve the conventional limitation on the yield rate.

The present invention has an objective to provide an injection molding machine to solve the disadvantages of the conventional technique as described above.

In order to solve the above-described disadvantage, an injection molding machine M according to the first embodiment of the present invention includes: a clamping apparatus Mc for clamping a metal mold 2 consisting of a stationary mold 2c and a movable mold 2m with a predetermined clamping force; an injection apparatus Mi for injecting resin to the clamped the metal mold 2 at a predetermined injection pressure to fill the metal mold 2 with the resin; and a molding machine controller C for controlling the clamping apparatus Mc and the injection apparatus Mi. A partial reflux injection function part 5 is provided according to which the screw 4 accommodated in the heating cylinder 3 of the injection apparatus Mi is allowed to move forward to thereby inject, into the metal mold 2, the resin R at the front side of the screw head portion 4s at the front end of the screw 4 to fill the metal mold 2 with the resin R and a predetermined amount of resin to be used as a part of the resin R is refluxed to the screw body part 4m at the rear side of the screw head portion 4s so that the resin R at the front side of the screw head portion 4s is injected into the metal mold 2 to fill the metal mold 2 with the resin R in synchronization with the refluxing of a predetermined amount of resin as the reflux resin Rm to the screw body part 4m side at the rear side of the screw head portion 4s through the inner side of the screw head portion 4s and/or the outer periphery side of the screw head portion 4s.

In this case, the injection molding machine M according to the first embodiment is desirably configured, according to the preferred embodiment of the invention, so that the predetermined amount is selected to be within a range of 10-60[%] of the capacity of the resin R injected into the metal mold 2 to fill the metal mold 2 with the resin R. The partial reflux injection function part 5 is configured so that the screw head portion 4s includes at least one reflux paths 11 . . . in which resin Rm is refluxed and more desirably includes the injection pressure additional setting function part Fs to set the injection pressure during molding Pis to be higher than an injection pressure Pi with no reflux of the resin Rm by a predetermined magnitude or includes the reverse rotation control function section Fc for reversely rotating the screw 4 and more desirably the reverse rotation control function section Fc can include the reverse rotation setting function part Fcs to set the period within which the screw 4 is reversely rotated and the rotation speed. On the other hand, the clamping apparatus Mc is used that provides the natural compression of the resin R at least in accordance with the solidification of the resin R in the metal mold 2. The molding machine controller C can include a control function according to which an injection pressure (hereinafter molding injection pressure) Pi providing a non-defective molding and a clamping force (hereinafter molding clamping force) Pc providing a non-defective molding are calculated and set in advance so as to allow, during injection and filling, the movable mold 2m and the stationary mold 2c have therebetween a predetermined mold clearance Lm. During molding, the clamping apparatus Mc is clamped with the molding clamping force Pc and the molding injection pressure Pi is set as the limiter pressure Ps, thereby driving the injection apparatus Mi to inject the resin R into the metal mold 2 to fill the metal mold 2 with the resin R.

In order to solve the above-described disadvantage, the injection molding machine M according to the second embodiment of the present invention provides the injection molding machine configured to include: the clamping apparatus Mc to clamp the metal mold 2 consisting of the stationary mold 2c and the movable mold 2m with a predetermined clamping force; the injection apparatus Mi to inject resin to the clamped metal mold 2 with the predetermined injection pressure to fill the metal mold 2 with the resin; and the molding machine controller C to control the clamping apparatus Mc and the injection apparatus Mi. The screw 4 accommodated in the heating cylinder 3 of the injection apparatus Mi is allowed to move forward to thereby inject, into the metal mold 2, the resin R at the front side of the screw head portion 4s at the front end of the screw 4 to fill the metal mold 2 with the resin R and a predetermined amount of resin to be used as a part of the resin R is refluxed to the screw body part 4m at the rear side of the screw head portion 4s by allowing the molding machine controller C to sequentially perform: the plasticization step Wi1 of rotating the screw 4 in the heating cylinder 3 to thereby subject the resin in the heating cylinder 3 to a plasticization processing; the injection step Wi2 to allow, after the completion of the plasticization step Wi1, the screw 4 to move forward to inject, into the metal mold 2, a part of the plasticized resin R accumulated at the front side of the screw head portion 4s of the screw 4 to fill the metal mold 2 with the resin R; and the plasticization promotion step Wi3 to allow, after the completion of the injection step Wi2, a part of the remaining part of the resin R to be refluxed as the reflux resin Rm to the rear side of the screw head portion 4s.

In this case, the injection molding machine M according to the second embodiment is configured, according to the preferred embodiment of the invention, so that the injection apparatus Mi includes a shutoff nozzle (or valve nozzle) 51. The clamping apparatus Mc provides the natural compression of the resin R at least in accordance with the solidification of the resin R in the metal mold 2. The molding machine controller C can include a control function according to which the molding injection pressure Pi providing a non-defective molding and the molding clamping force Pc providing a non-defective molding are calculated and set in advance so that the movable mold 2m and the stationary mold 2c have therebetween a predetermined mold clearance Lm during injection and filling. During molding, the clamping apparatus Mc is clamped with the molding clamping force Pc and the molding injection pressure Pi is set as the limiter pressure Ps to thereby drive the injection apparatus Mi to inject the resin R into the metal mold 2 to fill the metal mold 2 with the resin R. The plasticization promotion step Wi3 may allow the accumulated plasticized resin R to be refluxed by the pressurization control function to apply a pressure to the front side of the screw 4 or by the reverse rotation control function to the screw 4. The plasticization promotion step Wi3 may be performed, before the plasticization promotion processing (S122) is substantially performed, by performing the auxiliary plasticization processing (S121) to secure the amount of the reflux resin Rm or by setting an auxiliary plasticization processing part for performing an auxiliary plasticization processing and a plasticization promotion processing part for performing a plasticization promotion processing based on which a step of the combination of the auxiliary plasticization processing part (S201) and the plasticization promotion processing part (S202) can be repeated the number N set in advance or for the time allowable in the plasticization promotion step Wi3.

The injection molding machine M according to the present invention as described above provides significant effects as shown below.

The screw 4 accommodated in the heating cylinder 3 of the injection apparatus Mi is allowed to move forward to thereby inject, into the metal mold 2, the resin R at the front side of the screw head portion 4s at the front end of the screw 4 to fill the metal mold 2 with the resin R. A predetermined amount of resin to be used as a part of the resin R is allowed to be refluxed as the reflux resin Rm to the screw body part 4m at the rear side of the screw head portion 4s. This consequently can provide the final molded items having a further-improved yield rate and can provide in particular the injection molding machine M using a new injection molding method that can further improve the yield rate having a limitation in the conventional case. As a result, large molded items and special resin molded items for example can be produced with an improved production efficiency and a reduced production cost, thus effectively contributing to the avoidance of a resource loss and a wasteful energy consumption.

According to the preferred embodiment, in the injection molding machine M according to the first embodiment, the amount of the reflux resin Rm (predetermined amount) is selected to be within a range of 10-60[%] of the capacity of the resin R injected into the metal mold 2 to fill the metal mold 2 with the resin R. Such a selection can provide a good balance between the production efficiency and the yield rate in the molded item production. Thus, the production efficiency and the yield rate are both optimized.

According to the preferred embodiment, in the injection molding machine M according to the first embodiment, the partial reflux injection function part 5 is configured so that the screw head portion 4s includes at least one reflux paths 11 . . . in which the resin Rm is refluxed. This can be realized by the change or additional processing for example of the screw head portion 4s. Thus, this configuration can be provided in an easy and low-cost manner and can be provided in a versatile manner by being applicable to an existing injection molding machine for example.

According to the preferred embodiment, in the injection molding machine M according to the first embodiment, the partial reflux injection function part 5 is configured to include the injection pressure additional setting function part Fs to set the injection pressure during molding Pis to be higher than the injection pressure Pi with no reflux of the resin R by a predetermined magnitude. This allows, even when the reflux path 11 . . . is included, the amount of the reflux resin Rm (reflux amount) to be arbitrarily set by the injection pressure additional setting function part Fs, thus easily setting the reflux amount and avoiding the influence on the original amount of the resin R injected into the metal mold 2 to fill the mold with the resin R (filling amount).

According to the preferred embodiment, in the injection molding machine M according to the first embodiment, the partial reflux injection function part 5 configured to include the reverse rotation control function section Fc for reversely rotating the screw 4 eliminates the need to change the form of the screw 4 itself. Thus, the screw 4 can be subjected to the control processing to thereby provide refluxing, thus providing a further simplification and improved versatility.

According to the preferred embodiment, the reverse rotation control function section Fc is configured to include the reverse rotation setting function part Fc to set the period within which the screw 4 is reversely rotated and rotation speed. This allows the reflux amount of the reflux resin Rm to be set by the reverse rotation setting function part Fcs, thus allowing an arbitrary reflux amount to be set easily and avoiding an influence on the original filling amount of the resin injected into the metal mold 2 for a filling purpose.

According to the preferred embodiment, a control function is used according to which the clamping apparatus Mc is used to provide the natural compression of the resin R at least in accordance with the solidification of the resin R in the metal mold 2. The molding machine controller C can include a control function according to which an injection pressure (hereinafter molding injection pressure) Pi providing a non-defective molding and a clamping force (hereinafter molding clamping force) Pc providing a non-defective molding are calculated and set in advance so as to allow, during injection and filling, the movable mold 2m and the stationary mold 2c to have therebetween a predetermined mold clearance Lm. During molding, the clamping apparatus Mc is clamped with the molding clamping force Pc and the molding injection pressure Pi is set as the limiter pressure Ps, thereby driving the injection apparatus Mi to inject the resin R into the metal mold 2 to fill the metal mold 2 with the resin R. By doing this, the molding method already suggested by the applicant (see International Publication WO2011/161899) can be used. Specifically, a specific molding mode not including a measuring step, which is hardly influenced by the injection apparatus Mi-side state, (i.e., the specific molding mode hardly influenced by the injection apparatus Mi-state) can be used. Thus, the improved production efficiency and the reduced production cost can be realized, thus contributing to the avoidance of a resource loss and a wasteful energy consumption.

According to the preferred embodiment, in the injection molding machine M according to the second embodiment, the injection apparatus Mi includes a shutoff nozzle (or valve nozzle) 51 by which the nozzle opening 3ne can be shut off.

Thus, the plasticization promotion step Wi3 can be performed even during the cooling step Wc4, the mold-opening step Wc5, and/or the molded item removal step Wc6. As a result, the plasticization promotion processing can be performed for a sufficient time, thus performing the injection molding machine M according to the present invention in a more secure and favorable manner.

According to the preferred embodiment, in the injection molding machine M according to the second embodiment, the resin R is refluxed by the pressurization control function to increase the pressurization to the front side of the screw 4. According to the pressurization control function, the pressure of the resin R accumulated at the front side of the screw 4 can be increased after the completion of the injection step Wi2 and after the resin R in the metal mold 2 is sufficiently solidified when no influence is caused on the molded item in the metal mold 2, thus providing the refluxing using this pressurization. Thus, this function can be carried out more easily by allowing the screw head portion 4s to include therein a slight reflux path in which no reflex is caused depending on the molding injection pressure Pi or by providing a reflux path having an open/close function for example.

According to the preferred embodiment, in the injection molding machine M according to the second embodiment, the resin R is refluxed by subjecting the screw 4 to the front pressurization control function and the reverse rotation control function. Thus, the screw 4 subjected to the reverse rotation control can provide the adjustment of the reflux amount. Thus, the arbitrary reflux amount of the resin Rm can be easily and accurately set by selecting the conditions such as the period of the reverse rotation and the rotation speed for example.

According to the preferred embodiment, in the injection molding machine M according to the second embodiment, when the plasticization promotion step Wi3 is performed, before the plasticization promotion processing (S122) is substantially performed, the auxiliary plasticization processing (S121) is performed to secure the amount of the reflux resin Rm. This allows, even when a small amount of the accumulated plasticized resin R is accumulated at the front side of the screw 4 when the injection step Wi2 is completed, the auxiliary plasticization processing (S121) to be performed for a predetermined time to thereby secure the required amount of the reflux resin Rm.

According to the preferred embodiment, in the injection molding machine M according to the second embodiment, the plasticization promotion step Wi3, an auxiliary plasticization processing part for performing an auxiliary plasticization processing and a plasticization promotion processing part for performing a plasticization promotion processing are set based on which a step of the combination of the auxiliary plasticization processing part (S201) and the plasticization promotion processing part (S202) can be repeated the number N set in advance or for the time allowable in the plasticization promotion step Wi3. This allows, when a relatively-long cooling time is required as in the case of a large molded item for example, the repeated processing as described above to be performed, thereby realizing the effective use of the cooling time. The result is that the resin R can be subjected to the plasticization processing in a more uniform and fine manner, thus contributing to molded items having a further-improved quality and an improved yield rate.

2: metal mold, 2*c*: stationary mold, 2*m*: movable mold, 3: heating cylinder, 4: screw, 4*s*: screw head portion, 4*m*: screw body part, 5: partial reflux injection function part, 11 . . . : reflux path, 51: shutoff nozzle (or valve nozzle), M: injection molding machine, Mc: clamping apparatus, Mi: injection apparatus, C: molding machine controller, R: resin, Rm: reflux resin, Pis: injection pressure, Pi: injection pressure (molding injection pressure), Pc: molding clamping force, Fs: injection pressure additional setting function part, Fc: reverse rotation control function section, Fcs: reverse rotation setting function part, Lm: mold clearance, Wi1: plasticization step, Wi2: injection step W, Wi3: plasticization promotion step, (S121): auxiliary plasticization processing, (S122): plasticization promotion processing, (S201): auxiliary plasticization processing part, (S202): plasticization promotion processing part

DETAILED DESCRIPTION OF THE INVENTION

Next, the following section will describe a preferred embodiment according to the present invention in detail based on the drawings.

Figure 1:
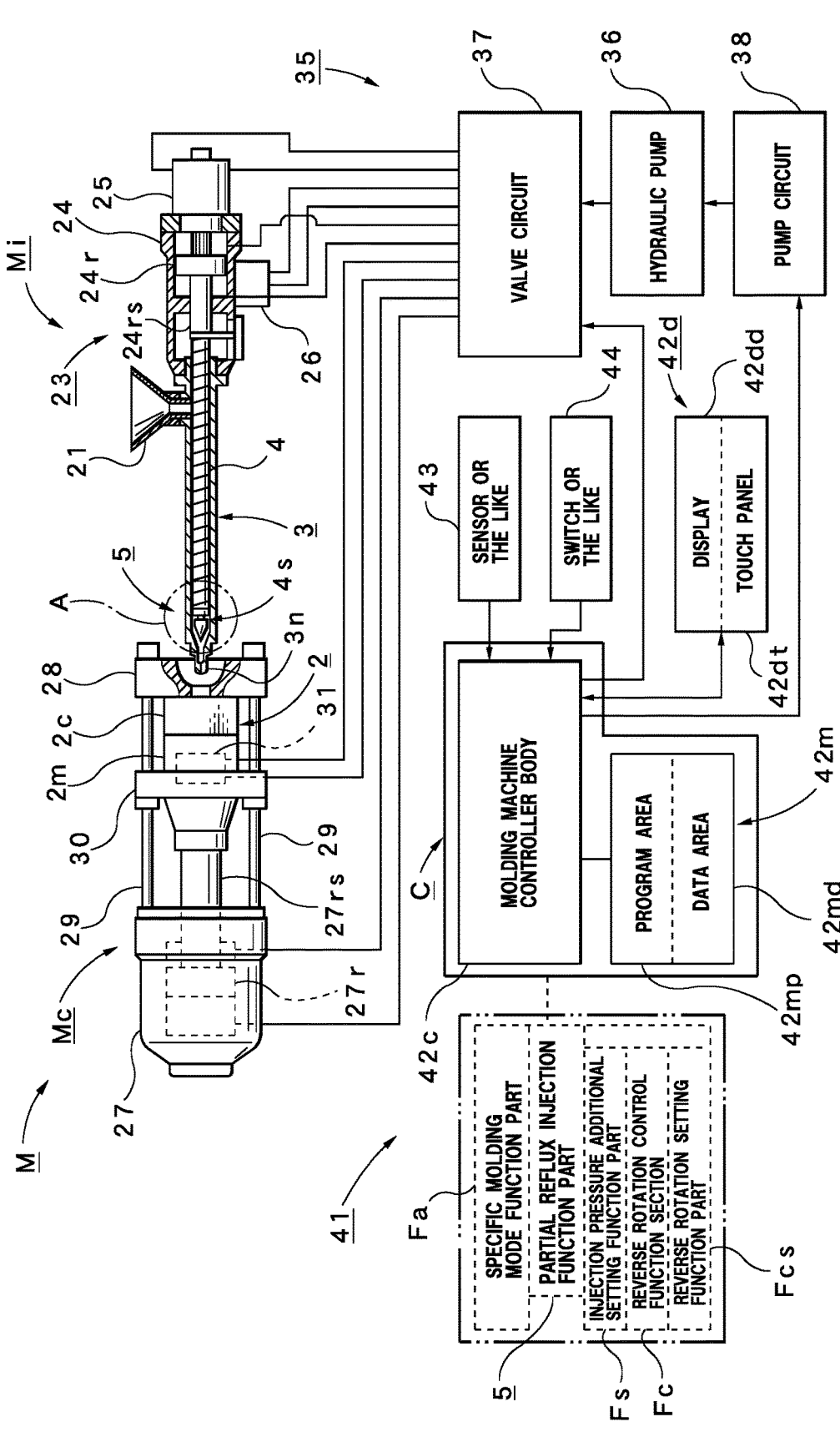
FIG. 1 illustrates the entire configuration of an injection molding machine according to a preferred embodiment of the present invention.

First, the following section will describe the main components of the entirety of an injection molding machine M according to this embodiment with reference to FIG. 1.

In FIG. 1, the reference numeral M denotes an injection molding machine including an injection apparatus Mi and a clamping apparatus Mc. The injection apparatus Mi has a heating cylinder 3 configured so that the front end thereof has an injection nozzle 3*n* and the rear part thereof has a hopper 21, respectively. The interior of the heating cylinder 3 receives a screw 4 penetrating therethrough. The rear end of the heating cylinder 3 has a screw driving section 23. The screw driving section 23 has an injection cylinder (hydraulic cylinder) 24 including therein a single rod-type injection ram 24*r*. A ram rod 24*rs* projecting to the front side of the injection cylinder 24 is coupled to the rear end of the screw. The rear end of the injection ram 24*r* is spline-coupled to a shaft of a metering motor (oil motor) 25 attached to the injection cylinder 24. The reference numeral 26 denotes an injection apparatus moving cylinder that allows the injection apparatus Mi to move in forward and backward directions to provide the nozzle touch into the metal mold 2 or the cancellation thereof. This allows the injection apparatus Mi to provide the nozzle touch of the injection nozzle 3*n* to the metal mold 2 to thereby inject the molten (or plasticized) resin R (FIG. 5) into the cavity of the metal mold 2 to fill the cavity with the resin.

On the other hand, the clamping apparatus Mc is a direct pressure-type hydraulic clamping apparatus that provides the displacement of a movable mold 2*m* by a driving ram 27*r* of a clamping cylinder (hydraulic cylinder) 27. This clamping apparatus Mc has stationary platens 28 that have a fixed position and that are provided to be away from each other. This clamping apparatus Mc also has movable platens 30 slidably provided on a plurality of tie bars 29 . . . bridging between the stationary platen 28 and the clamping cylinder 27. Fixed to this movable platen 30 is the tip end of the ram rod 27*rs* projecting to the front side of the clamping cylinder 27. The stationary platen 28 is attached with the stationary mold 2*c*. The movable platen 30 is attached with the movable mold 2*m*. The stationary mold 2*c* and the movable mold 2*m* constitute a metal mold 2. This arrangement allows the clamping cylinder 27 to provide the mold open/close and the clamping to the metal mold 2. In this case, since the clamping apparatus Mc uses the clamping cylinder (hydraulic cylinder) 27, the clamping apparatus Mc can provide the natural compression of the resin R at least in accordance with the solidification of the resin R in the metal mold 2.

On the other hand, the injection molding machine M includes a hydraulic circuit 35 shown in FIG. 1. This hydraulic circuit 35 includes a variable discharging-type hydraulic pump 36 and a valve circuit 37 constituting a hydraulic driving source and includes a pump circuit 38 for controlling the driving of the hydraulic pump 36. The hydraulic pump 36 has a swash plate (not shown). Thus, an increase of the inclination angle of the swash plate (swash plate angle) causes an increase of the pump piston stroke and can provide an increased discharge flow rate. A decrease of the swash plate angle can provide the decrease of the pump piston stroke, thus providing the decrease of the discharge flow rate. Thus, the swash plate angle set to a predetermined angle can provide a fixed discharge flow rate for which the discharge flow rate (maximum capacity) is set to a predetermined magnitude.

The discharge opening of the hydraulic pump 36 is connected to the first side of the valve circuit 37. The second side of the valve circuit 37 is connected to the injection cylinder 24, the metering motor 25, a clamping cylinder 27, an ejector cylinder 31, and an injection apparatus moving cylinder 26 of the injection molding machine M. Thus, the valve circuit 37 includes switching valves (electromagnetic valves) connected to the injection cylinder 24, the metering motor 25, the clamping cylinder 27, the ejector cylinder 31, and the injection apparatus moving cylinder 26, respectively. Each switching valve is composed of required accessory hydraulic components for example such as one or two or more valve component(s). Each switching valve has a function to switch the supply, stoppage, and discharge of hydraulic oil at least to the injection cylinder 24, the metering motor 25, the clamping cylinder 27, the ejector cylinder 31, and the injection apparatus moving cylinder 26.

The pump circuit 38 can control a pump motor (servo motor) of the variable discharging-type hydraulic pump 36 to thereby change the discharge flow rate and the discharge pressure based on which the driving control can be provided to the injection cylinder 24, the metering motor 25, the clamping cylinder 27, the ejector cylinder 31, and the injection apparatus moving cylinder 26 described above and the control can be provided to the respective operation steps of the molding cycle. As described above, the use of the variable discharging-type hydraulic pump 36 for which the fixed discharge flow rate can be changed by a change of the swash plate angle can provide the pump capacity set to a fixed discharge flow rate (maximum capacity) having the predetermined magnitude and can provide a change of the discharge flow rate and the discharge pressure based on the fixed discharge flow rate, thus providing an easy and smooth control.

The injection molding machine M also includes a control system 41 shown in FIG. 1. This control system 41 has a control function to perform a molding processing based on a specific molding mode. According to this specific molding mode, a molding injection pressure Pi and a molding clamping force Pc are calculated in advance so as to cause a predetermined mold clearance Lm between the movable mold 2m and the stationary mold 2c during injection and filling and the molding injection pressure Pi can provide a non-defective molding and the molding clamping force Pc can provide a non-defective molding. During molding, the molding clamping force Pc is used to clamp the clamping apparatus Mc and the molding injection pressure Pi is set as a limiter pressure Ps. The injection apparatus Mi is driven to inject the resin R into the metal mold 2 to fill the metal mold 2 with the resin R.

The control system 41 includes a molding machine controller body 42c and a molding machine controller C having a display 42d having access to this molding machine controller body 42c. The molding machine controller body 42c has a computer function including a hardware such as a CPU and an internal memory and includes an internal memory 42m having a program area 42mp in which various programs are stored such as a control program (software) to perform various calculation processing and various control processings (sequence control) and a data area 42md in which various pieces of data (database) for example can be stored. Thus, the program area 42mp stores therein such software that is used to execute the above-described specific molding mode and that can function as a specific molding mode function part Fa.

The display 42d includes a display body 42dd and a touch panel 42dt provided to the display body 42dd. The display body 42dd and the touch panel 42dt are connected to the molding machine controller body 42c via a display interface (not shown). Thus, the touch panel 42dt can be used to set and select various operations for example.

The molding machine controller body 42c is connected to various sensors 43 including a mold clearance sensor for detecting at least the mold clearance Lm and various switches 44 and is connected to the pump circuit 38 and the valve circuit 37 described above.

Next, the following section will specifically describe the main components and functions of the injection molding machine M according to this embodiment with reference to FIG. 1-FIG. 13.

The injection molding machine M according to this embodiment includes, in addition to the above-described main components, a partial reflux injection function part 5 constituting the main part of the present invention. Specifically, the screw 4 accommodated in the heating cylinder 3 of the injection apparatus Mi is allowed to move forward to thereby inject and fill, into the metal mold 2, the resin R at the front side of the screw head portion 4s at the front end of the screw 4 and a predetermined amount of the reflux resin Rm to be used as a part of the resin R is refluxed to the screw body part 4m side at the rear side of the screw head portion 4s through the inner side of the screw head portion 4s and/or the outer periphery side of the screw head portion 4s.

Thus, as shown in FIG. 1, the molding machine controller C stores therein software to allow the partial reflux injection function part 5 to function. This software provides the functioning of an injection pressure additional setting function part Fs, a reverse rotation control function section Fc, and a reverse rotation setting function part Fcs described later, respectively.

The following section will describe the injection molding machine M according to the first embodiment including the partial reflux injection function part 5 as a main component of the present invention by way of the first Example and the second Example.

First Embodiment

Figure 2:
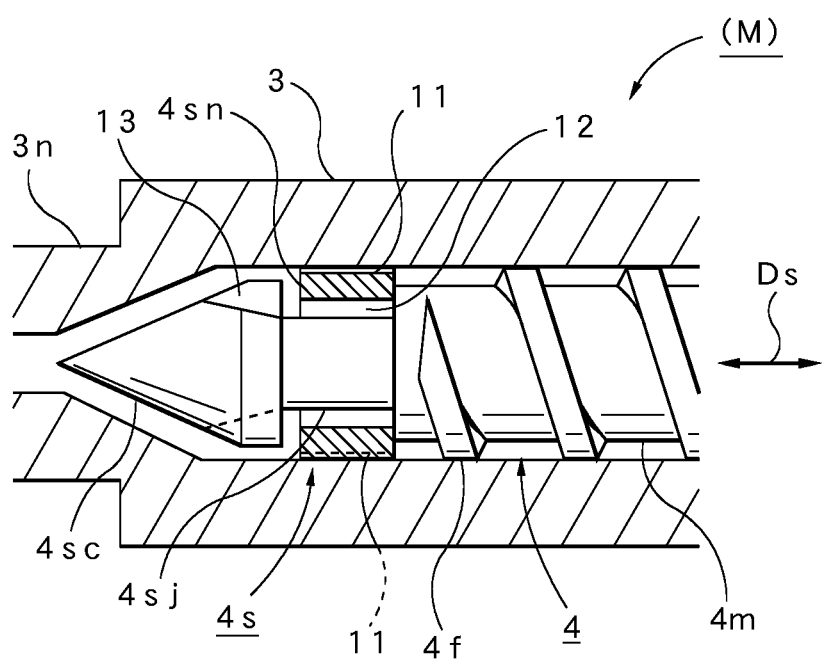
FIG. 2 is a cross-sectional side view illustrating a part of the injection apparatus provided in the injection molding machine according to the first Example of the above embodiment (section A shown by the virtual line circle in FIG. 1).
Figure 3:
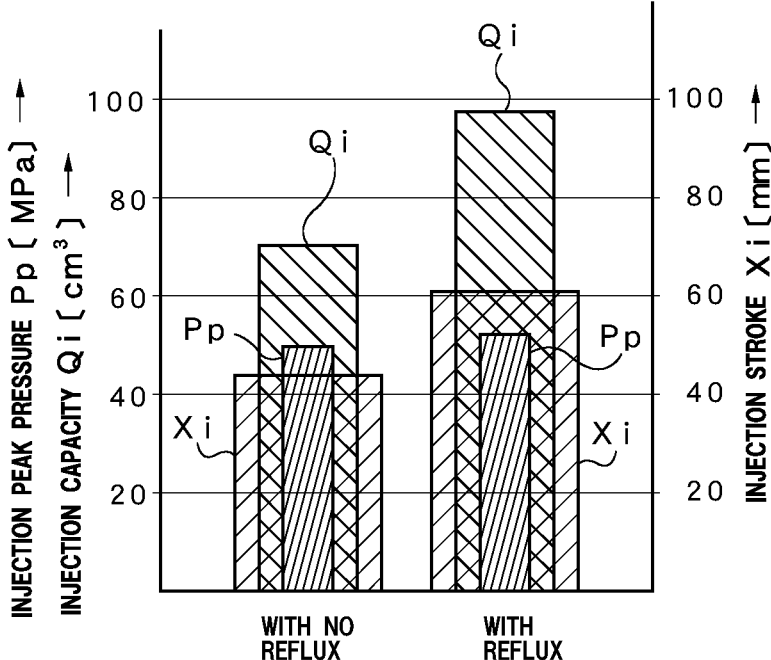
FIG. 3 is a bar graph showing the magnitudes of various physical quantities when the reflux by the injection molding machine is performed and when the reflux by the injection molding machine is not performed.

First, the following section will describe, with reference to FIG. 1-FIG. 3, the configuration of the partial reflux injection function part 5 included in the injection molding machine M according to the first Example.

FIG. 2 is a partial view of the injection apparatus Mi in the injection molding machine M shown in FIG. 1 (i.e., a partial enlarged view of the section A shown by the virtual line circle), illustrating a part of the injection apparatus Mi including the partial reflux injection function part 5 according to the first Example.

In FIG. 2, the reference numeral 4 denotes a screw. The screw body part 4*m* has, in the peripheral face thereof, a spiral screw flight 4*f*. The screw 4 has, at the front end thereof, a screw head portion 4*s*. The illustrated screw head portion 4*s* has, at the front end thereof, a conical tip end section 4*sc*. The conical tip end section 4*sc* has a rear end face that is attached to the front-end face of a screw body part 4*m* via an attachment axis section 4*sj* provided in the axial direction Ds. The conical tip end section 4*sc* and the screw body part 4*m* have therebetween a cylindrical check valve section 4*sn* that can be moved in the front-and-rear direction.

The following section will describe the function of the check valve in the molding mode of the general injection molding machine. First, in a measuring step, resin travelling from the screw body part side to the front side of the screw head portion is measured. Thus, the travel of the resin causes the check valve to move to an open position at the front side. Specifically, the resin is allowed to travel in the front direction. In the injection step, the measured resin pressure acts on the rear side to thereby cause the check valve to move to a close position at the rear side. This consequently allows the check valve to stop the backflow of the resin to the rear side. Thus, the check valve has a cylindrical shape. The check valve has an outer peripheral face abutted to the inner peripheral face of the heating cylinder to substantially eliminate any clearance. At the inner side of the inner peripheral face of the check valve, a resin path through which resin can flow is blocked.

On the other hand, the injection molding machine M according to the first Example of the present invention is configured as shown in FIG. 2 so that the check valve section 4*sn* has entirely a cylindrical shape and has, on the outer peripheral face thereof, at least one reflux paths 11 . . . through which the reflux resin Rm is allowed to pass in the rearward direction (in the illustrated case, a plurality of reflux paths 11 . . . provided in a circumferential direction with an equal interval). The configuration including the reflux paths 11 . . . described above can be realized by the change or additional processing for example of the screw head portion 4*s*. Thus, this configuration can be provided in an easy and low-cost manner and can be provided in a versatile manner by being applicable to an existing injection molding machine for example.

In this case, the reflux path 11 is formed by straight grooves parallel in the axial direction Ds. The reflux path 11 has a cross-sectional area preferably selected so that the amount of the reflux resin Rm (reflux amount) is within a range of 10-60[%] of the capacity of the resin R injected into the metal mold 2 to fill the metal mold 2 with the resin R. Such a selection can provide a good balance between the production efficiency and the yield rate in the molded item production. Thus, the production efficiency and the yield rate are both optimized.

In FIG. 2, the reference numeral 12 denotes a resin path provided between the inner peripheral face of the check valve section 4*sn* and the outer peripheral face of the attachment axis section 4*sj*. The reference numeral 13 . . . denotes a plurality resin paths formed in the outer peripheral face of the conical tip end section 4*sc*. The resin paths 13 . . . are formed as notches in the circumferential direction with an equal interval, respectively. This can provide, even when the check valve section 4*sn* is moved to the open position at the front side and is abutted to the rear end face of the conical tip end section 4*sc*, the communication between the resin path 12 and the resin path 13 . . . and the check valve section 4*sn* is allowed to move to the close position at the rear side and is abutted to the front-end face of the screw body part 4*m*, thereby blocking the resin path 12.

The reflux amount of the reflux resin Rm depends on the existence of the reflux paths 11 . . . and the magnitude of the injection pressure during molding. Thus, the partial reflux injection function part 5 in the first Example is configured so that the molding machine controller C has the injection pressure additional setting function part Fs that can change a molding injection pressure Pi (the limiter pressure Ps) (which will be described later). This injection pressure additional setting function part Fs has at least a function to set the injection pressure Pis during molding so as to be higher, by a predetermined magnitude, than the molding injection pressure Pi when the resin R is not refluxed.

The existence of the injection pressure additional setting function part Fs as described above allows, even when the reflux paths 11 . . . are included in the configuration, the reflux amount of the reflux resin Rm to be arbitrarily set by the injection pressure additional setting function part Fs. Thus, the reflux amount can be set easily and any influence is prevented from being transmitted to the original amount of resin R injected into the metal mold 2 to fill the metal mold 2 with the resin R (filling amount). Thus, the injection pressure Pis used for a refluxing operation during molding is desirably set so as to have no influence on the original molding at the molding injection pressure Pi when no refluxing is performed.

FIG. 3 illustrates the magnitudes of the respective physical quantities during molding when the resin R is not refluxed (no reflux) and when a predetermined amount of the reflux resin Rm is refluxed (with reflux). In FIG. 3, the injection peak pressure Pp corresponds to the limiter pressure Ps (which will be described later). Thus, in the illustrated case, the injection peak pressure Pp with no reflux (the limiter pressure Ps) is 50.5 [MPa] while the injection peak pressure Pp with reflux (i.e., the injection molding method using the injection molding machine M according to this embodiment) is set to 52.5 [MPa] that is slightly higher than the injection peak pressure Pp with no reflux. This injection peak pressure Pp (the limiter pressure Ps) can be set by the injection pressure additional setting function part Fs.

As a result, the injection capacity Qi with no reflux is 71.2 [cubic centimeter] while the injection capacity Qi with reflux shows an increase to 98.0 [cubic centimeter]. Thus, the reflux rate is {(98.0-71.2)/71.2}×100=37.6[%] and thus remains within the range of 10-60[%]. In accordance with this, the screw injection stroke Xi during injection with no reflux is 44.8 [mm] and the screw injection stroke Xi during injection with reflux shows an increase to 61,4 [mm].

In this manner, the partial reflux injection function part 5 is configured so that the injection pressure Pis during molding is set by the injection pressure additional setting function part Fs to be higher by a predetermined magnitude than the injection pressure Pi with no reflux of the resin R. This allows, even when the configuration includes the reflux paths 11 . . . , the reflux amount of the reflux resin Rm to be arbitrarily set by the injection pressure additional setting function part Fs. This allows the reflux amount to be set easily and prevents an influence on the original amount of the resin R injected into the metal mold 2 to fill the mold with the resin R (filling amount).

Next, the following section will describe the molding procedure of the injection molding method using the injection molding machine M according to the first Example with reference to FIG. 1-FIG. 8.

First, the previous setting of the specific molding mode used in the injection molding method is performed for the injection molding machine M according to this embodiment. The basic molding procedure of the specific molding mode is the same as the procedure disclosed in the above-described Patent Publication 1 (International Publication WO2011/161899) already suggested by the applicant.

The following section will describe the previous setting procedure. First, the molding machine controller body 42c sets the injection pressure used as the injection apparatus Mi-side injection conditions as an initial setting. This injection pressure can be set as an injection pressure based on the capability of the injection apparatus Mi (driving force). The clamping force functioning as the clamping apparatus Mc-side clamping conditions is initially set by the molding machine controller body 42c. This clamping force can be set as a clamping force based on the capability of the injection apparatus Mi (driving force).

Next, the initially-set injection pressure is subjected to an optimization processing to thereby calculate the molding injection pressure Pi used for the production. The initially-set clamping force is subjected to the optimization processing to thereby calculate the molding clamping force Pc used for the production. The clamping force and the injection pressure can be optimized in the manner as described below. First, the initially-set clamping force and injection pressure are used to perform a test molding. A clamping force set to have a high value prevents burr and causes a defective or slightly-defective tendency with regard to sink, warpage, and a degassed state. The clamping force magnitude and the injection pressure magnitude are changed in a stepwise manner and the test molding is performed at each step. This allows the magnitude of the mold clearance Lm between the stationary mold 2c and the movable mold 2m to be acquired by a mold clearance sensor (e.g., reflection optical sensor or the like) (not shown) to display the result on a waveform display section in the screen of the display 42d and to observe whether the resultant molded items are acceptable or not.

Figure 7:
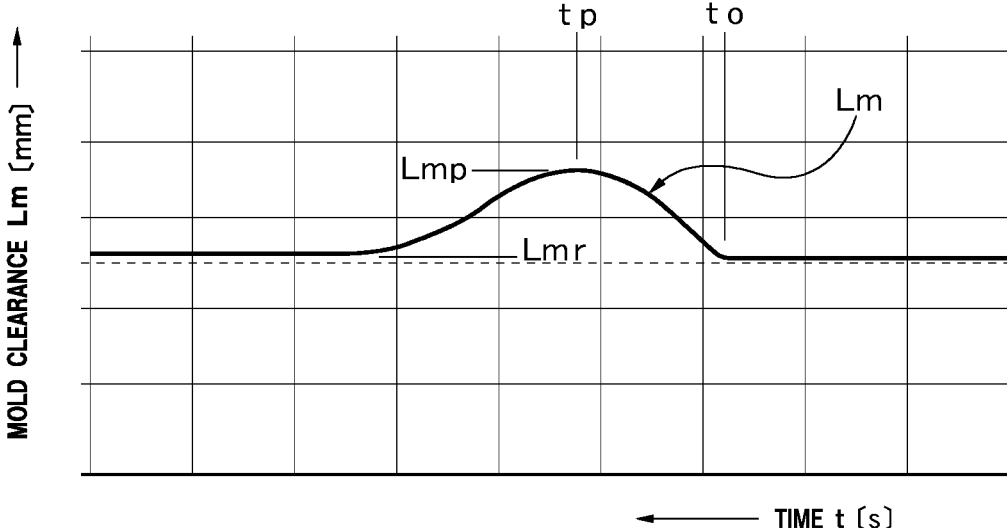
FIG. 7 illustrates the relation between time and the mold clearance in the molding step in the injection molding machine.

FIG. 7 illustrates the change of the mold clearance Lm displayed by the waveform display section. As can be seen from FIG. 7, after the start of the injection, the metal mold 2 starts opening at the time "to" and the maximum mold clearance Lmp occurs at the time "tp". Thereafter, the metal mold 2 is displaced in a direction in which the metal mold 2 is gradually closed. Finally, the residual mold clearance Lmr is obtained.

The injection pressure can be optimized by setting the molding injection pressure Pi so that the movable mold 2m and the stationary mold 2c have therebetween the above-described predetermined mold clearance Lm (about 0.03-0.30 [mm]) during injection and filling and a non-defective molding is possible. Specifically, the injection pressure is also appropriately changed and such a magnitude is selected that is just before the timing at which the metal mold 2 cannot be correctly filled with the resin R. The calculated molding injection pressure Pi is set as the limiter pressure Ps to the injection pressure during production.

In this case, the injection pressure additional setting function part Fs is used to set the injection pressure Pis during molding to be higher than the injection pressure Pi with no reflux by a predetermined magnitude as described above. In the illustrated case, the injection pressure Pis during molding is set to a value (52.5 [MPa]) slightly higher than the injection pressure Pi of 50.5 [MPa]. This injection pressure Pis is set as the limiter pressure Ps. On the other hand, these test moldings repeated with different conditions can provide a clamping force selected to satisfy the above-described conditions. The selected clamping force is set as the molding clamping force Pc used when a clamping operation is performed by the metal mold 2 during production. In this case, the magnitudes of the clamping force and the injection pressure may be arbitrarily set by an operator or may be automatically or semiautomatically calculated using an auto tuning function for example provided in the injection molding machine M.

Figure 4:
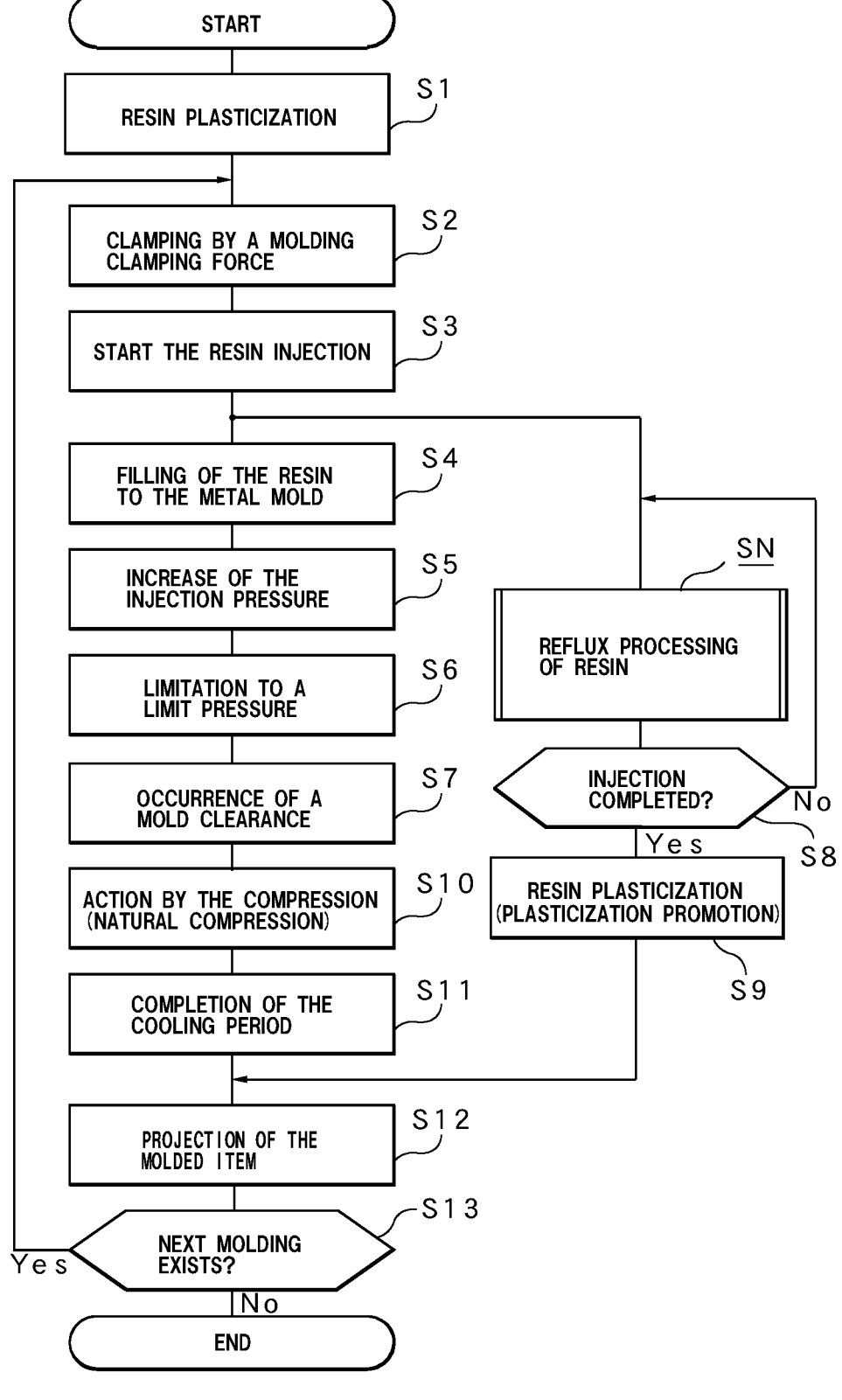
FIG. 4 is a flowchart illustrating a molding procedure by the injection molding method using the injection molding machine.

Next, the following section will describe a specific processing procedure during production with reference to the flowchart shown in FIG. 4.

During production, first, the resin R is subjected to the plasticization processing based on the basic molding method of the injection molding method using the injection molding machine M according to this embodiment (Step S1). In this case, a predetermined amount of the refluxed resin Rm (which will be described later) is also mixed in the resin R. Thus, this plasticization processing includes a plasticization promotion processing. During the plasticization processing, the hydraulic pump 36 is controlled and the valve circuit 37 is switched to thereby drive the metering motor 25 of the injection apparatus Mi to rotate.

The specific molding mode does not require a measuring step for accurately measuring the resin R such as a molding method based on a general molding mode. Specifically, the injection processing in the specific molding mode may be performed only by performing the injection operation until the cavity is filled with the resin R. Thus, the plasticization step can have sufficient resin R by subjecting a slightly large amount of the resin R to the plasticization processing. In other words, a measuring operation in a general measuring step is required but a measurement control for obtaining an accurate measurement value is not required. In particular, the injection molding machine according to this embodiment is desirably configured so as to include the reflux operation by the partial reflux injection function part 5 and a part of residual resin R accumulated through plasticization (the reflux resin Rm) (i.e., the reflux amount (Rm) within the range of 10-60[%] of the injection resin amount (R)) is refluxed by providing a plasticization processing amount two times more higher than the volume (amount of one shot) of the molded item.

Figure 5:
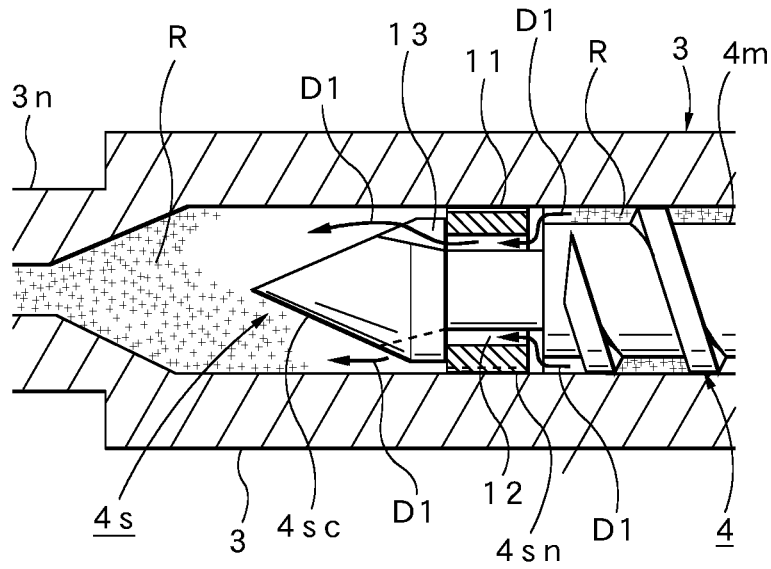
FIG. 5 illustrates the behavior of resin in the plasticization step in the injection molding machine.

FIG. 5 illustrates the behavior of the resin R during the plasticization processing. In this case, the screw 4 is rotated at the set rotation speed and for a set period. The rotation of the screw 4 allows the resin R to be sent to the front side. Thus, as shown by the arrow D1 . . . in FIG. 5, the resin R close to the screw body part 4m is accumulated through a screw head section 4s. Specifically, the resin R sent to the front side from the screw body part 4m allows the check valve section 4sn to travel to a front open position shown in FIG. 5. Thus, the resin R close to the screw body part 4m is allowed to reach the front side of the conical tip end section 4sc through the resin path 12 at the inner side of the check valve section 4sn and the resin path 13 . . . of the conical tip end section 4sc. As a result, the resin R obtained through the plasticization processing is gradually accumulated in the heating cylinder 3 at the front side of the conical tip end section 4sc and the accumulation causes the screw 4 to move to the rear side.

The hydraulic pump 36 is controlled and the valve circuit 37 is switched to thereby drive the clamping cylinder 27 of the clamping apparatus Mc. The metal mold 2 is clamped so that the clamping force is the set molding clamping force Pc (Step S2). Thereafter, the valve circuit 37 is switched and the hydraulic pump 36 is controlled to thereby drive the injection cylinder 24 of the injection apparatus Mi to start the processing to inject the resin R into the metal mold 2 (Step S3). In this case, the screw 4 may be allowed to advance based on a rated operation, thus eliminating the need for the speed control of the screw 4. When the injection is started, the resin R in the heating cylinder 3 is plasticized molten and the cavity of the metal mold 2 is filled with this resin R as shown by the arrow D2 in FIG. 6 through the injection nozzle 3n (Step S4). Then, in accordance with the cavity of the metal mold 2 is filled with the resin R, the injection pressure increases (Step S5). Thereafter, when the injection pressure reaches the limiter pressure Ps, a control to maintain the injection pressure at the limiter pressure Ps (injection pressure Pis) (i.e., a control for preventing overshooting) is performed to maintain (or limit) the injection pressure at the limiter pressure Ps (Step S6). Thus, the injection operation provides a provides a substantially one pressure control.

Figure 6:
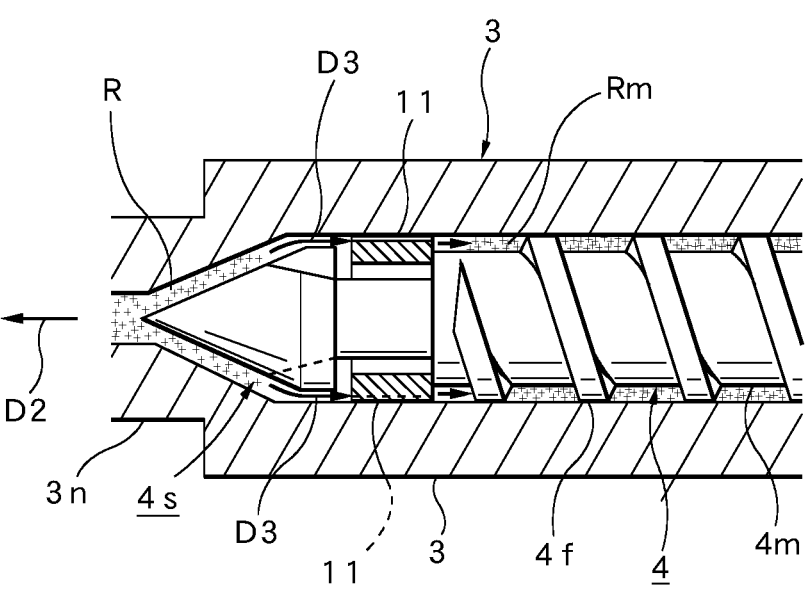
FIG. 6 illustrates the behavior of resin in the molding step in the injection molding machine.

On the other hand, when the injection of the resin in Step S3 is started, as shown in FIG. 6, the resin R accumulated at the front side of the screw 4 is injected into the metal mold 2 to fill the metal mold 2 with the resin R. At the same time, the partial reflux injection function part 5 allows a predetermined amount of the reflux resin Rm to be used as a part of the resin R to be gradually refluxed toward the screw body part 4m at the rear side of the screw head portion 4s (Step SN). Specifically, the screw 4 moved to the front side during injection provides the frontward resin pressure to thereby move the check valve section 4sn to the close position at the rear side. This consequently blocks the resin path 12 at the inner side of the check valve section 4sn but the screw the reflux resin Rm to be used as a part of the resin R accumulated at the front side of the head portion 4s is refluxed to the screw body part 4m through the injection pressure Pis as shown by the arrow D3 . . . shown in FIG. 6 to the clearance between the outer peripheral face of the conical tip end section 4sc of the screw head portion 4s and the inner peripheral face of the heating cylinder 3 and the reflux path 11 . . . in the outer peripheral face of the check valve section 4sn.

On the other hand, the cavity of the metal mold 2 filled with the resin R causes the metal mold 2 to be pressurized by the resin R, thereby causing the stationary mold 2c and the movable mold 2m to have therebetween the mold clearance Lm (FIG. 7) (Step S7). This mold clearance Lm occurs based on the molding clamping force Pc and the molding injection pressure Pi (injection pressure Pis) set in advance. In this case, after the elapse of the injection time set in advance since the start of the injection, the injection and filling of the resin R into the metal mold 2 is completed, thus stopping or decreasing the application of the molding injection pressure Pi (injection pressure Pis). As a result, the substantial injection step is completed and thus the reflux action is completed accordingly (Step S8).

After the completion of the injection step (reflux action), the resin R is subjected to the plasticization processing (Step S9). In this case, the front side of the screw body part 4m has a predetermined amount of the refluxed resin Rm mixed in the resin R (i.e., the reflux resin Rm of a part of the resin R subjected to the primary plasticization processing accumulated at the front side of the screw 4 is returned to the screw body part 4m and is mixed in the resin R). Thus, the resin R mixed with the reflux resin Rm is subjected to the plasticization processing. Thus, even when insufficiently-plasticized resin R is accumulated at the front side of the screw 4, the second plasticization processing is performed, thus further promoting the plasticization.

After the completion of the injection step, the solidification of the resin R is promoted with time elapsed and this solidification causes the natural compression of resin R to occur (Step S10). Specifically, the solidification of the resin R causes a decreased capacity. This decreased capacity causes the pressurization action by the elastic return of the metal mold 2 (the movable mold 2m in particular), thus causing a natural compression. After the elapse of the set cooling time, the valve circuit 37 is switched and the hydraulic pump 36 is controlled to drive the clamping cylinder 27 to move the movable mold 2m in the rearward direction to thereby open the mold. The ejector cylinder 31 is driven to detach the molded item attached to the movable mold 2m through a projection processing (Step S11, S12). This consequently allows the molded item to be removed, thereby completing one molding cycle. Thereafter, when the next molding is performed, processings such as clamping, injection, or cooling are similarly performed (Steps S13, S2 . . . ).

Figure 8:
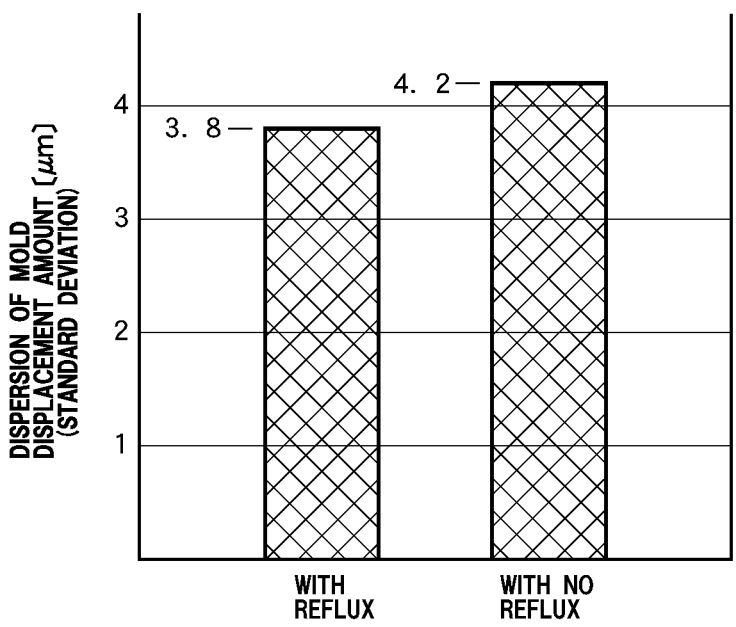
FIG. 8 illustrates the comparison of the standard deviation between the dispersion of the mold displacement amount by the injection molding machine and the dispersion of the mold displacement amount with no reflux.

FIG. 8 illustrates the comparison of the standard deviation between the dispersion of the mold displacement amount when the resin R is refluxed by the injection molding method using the injection molding machine M according to this embodiment (the first Example) (with reflux) and when the resin R is not refluxed by the injection molding method using the injection molding machine M according to this embodiment (the first Example). Specifically, FIG. 8 illustrates the dispersion of the maximum values Lmp of the mold clearance Lm in FIG. 7 when 30 molded items are molded. According to this, the standard deviation with no reflux is 4.2 [μm] while the standard deviation with reflux is 3.8[μm], showing an improvement of approximately 11[%]. This means that, the resin R subjected to the plasticization processing has a further improved homogenization. The resultant molded items showed a yield rate proportionally improved in accordance with the above improvement.

Thus, the injection molding machine M (injection molding method) according to the first Example as described above provides the following basic configuration (function). Specifically, the screw 4 accommodated in the heating cylinder 3 of the injection apparatus Mi is allowed to move forward to thereby the resin R at the front side of the screw head portion 4s at the front end of the screw 4 is injected into the metal mold 2 to fill the metal mold 2 with the resin R. At the same time, a predetermined amount of the reflux resin Rm to be used as a part of the resin R is refluxed to the screw body part 4m side at the rear side of the screw head portion 4s through the reflux path 11 . . . in the screw head portion 4s. This consequently can provide the final molded items having a significantly-improved yield rate and can provide in particular the injection molding machine using a new injection molding method that can further improve the yield rate having a limitation in the conventional case. As a result, large molded items and special resin molded items for example can be produced with an improved production efficiency and a reduced production cost, thus effectively contributing to the avoidance of a resource loss and a wasteful energy consumption.

In particular, the injection molding machine M (injection molding method) according to the first Example uses the clamping apparatus Mc that can provide the natural compression of the resin R at least in accordance with the solidification of the resin R in the metal mold 2. The molding injection pressure Pi providing a non-defective molding and molding clamping force Pc providing a non-defective molding are calculated and set in advance that allow the movable mold 2m and the stationary mold 2c to have therebetween a predetermined mold clearance Lm during injection and filling. During molding, the clamping apparatus Mc is clamped with the molding clamping force Pc and the molding injection pressure Pi is set as the limiter pressure Ps. The injection apparatus Mi is driven to inject resin into the metal mold 2 to fill the metal mold 2 with the resin. The use of this molding method allows the injection molding method by the injection molding machine M according to the present invention to be applied to a specific molding mode not including a measuring step (i.e., a specific molding mode substantially not being influenced by the state at the injection apparatus Mi side). Thus, the improved production efficiency and the reduced production cost as described above can be realized, thus effectively contributing to the avoidance of a resource loss and a wasteful energy consumption.

Second Embodiment

Figure 9:
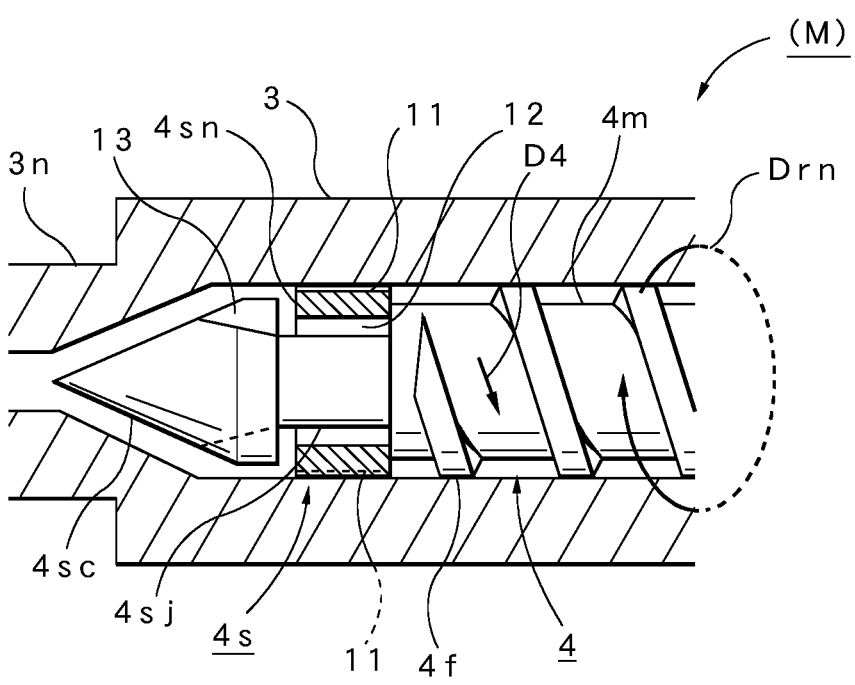
FIG. 9 is a cross-sectional side view illustrating a part of the injection apparatus provided in the injection molding machine according to the second Example of the embodiment (section A shown by the virtual line circle in FIG. 1).
Figure 10:
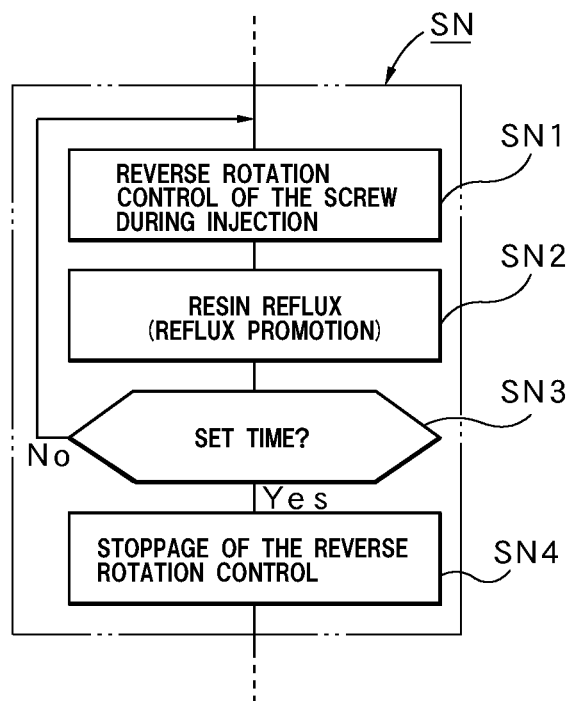
FIG. 10 illustrates the details of the steps SN in FIG. 4 of the molding procedure according to the injection molding method using the injection molding machine.

Next, the following section will describe the configuration of the partial reflux injection function part 5 provided in the injection molding machine M according to the second Example with reference to FIG. 9-FIG. 10.

FIG. 9 is a partial enlarged view illustrating a part of the injection apparatus Mi in the injection molding machine M shown in FIG. 1 (i.e., section A shown by the virtual line circle in FIG. 1), illustrating a part of the injection apparatus Mi including the partial reflux injection function part 5 according to the second Example.

As shown in FIG. 9, the injection apparatus Mi of the second Example has the basic configuration as that of the injection apparatus Mi provided in the injection molding machine M shown in FIG. 2 of the first Example. In the second Example, the partial reflux injection function part 5 is configured so that the molding machine controller C shown in FIG. 1 additionally has the reverse rotation control function section Fc to rotate the screw 4 in the reverse direction to thereby provide the promotion of the refluxing of the reflux resin Rm and the quantitative control. Thus, the program area 42mp of the internal memory 42m stores therein software to realize the reverse rotation control function section Fc. The partial reflux injection function part 5 configured to include the reverse rotation control function section Fc as described above eliminates the need to change the form of the screw 4 itself. Thus, the screw 4 can be subjected to the control processing to thereby provide refluxing, thus providing a further simplification and improved versatility.

The reverse rotation control function section Fc has the reverse rotation setting function part Fcs that sets a period within which the screw 4 is reversely rotated and the rotation speed. The existence of the reverse rotation setting function part Fcs as described above allows the reflux amount of the reflux resin Rm to be set by the reverse rotation setting function part Fcs, thus allowing an arbitrary reflux amount to be set easily and avoiding an influence on the original filling amount of the resin injected into the metal mold 2 for a filling purpose.

In this case, the period within which the screw 4 is reversely rotated and the rotation speed are desirably set so that the molding injection pressure Pi causes the screw 4 to move in the forward direction and the resin R at the front side of the screw head portion 4s is injected into the metal mold 2 in synchronization with the refluxing of the reflux resin Rm in an amount selected to be within the range of 10-60[%] of a predetermined amount of the reflux resin Rm to be used as a part of the resin R, (i.e., the capacity of the resin R injected into the metal mold 2 to fill the metal mold 2 with the resin R) to the screw body part 4m side at the rear side of the screw head portion 4s through the resin path 12 functioning as the inner side of the screw head portion 4s.

In FIG. 9, the same components as those of FIG. 1 and FIG. 2 are denoted with the same reference numerals to clarify the correspondence and will not be further described.

Next, the following section will specifically describe the molding procedure of the injection molding method using the injection molding machine M according to the second Example with reference to the flowcharts shown in FIG. 1 and FIG. 10 (FIG. 4).

The flowchart shown in FIG. 10 illustrates a specific processing in Step SN in the flowchart shown in FIG. 4. The entire molding procedure is performed based on the flowchart shown in FIG. 4. Specifically, the injection molding method using the injection molding machine M according to the second Example performs the previous setting similar to the one in the specific molding mode of the first Example. Regarding the specific processing procedure during production, Steps S1-S11 are basically the same except for the processing details of Step SN shown in FIG. 4. Thus, the following section will describe only the processing of the second Example in Step SN with reference to FIG. 10.

It is assumed that Step S3 in the flowchart shown in FIG. 4 is performed. In Step S3, the injection cylinder 24 of the injection apparatus Mi is driven to start the processing to inject the resin R into the metal mold 2 and the metal mold 2 is filled with the resin R accumulated at the front side of the screw 4 (Step S4).

On the other hand, a predetermined timing (e.g., the timing at which the injection processing is started or the timing at which the predetermined set time has elapsed), the reverse rotation control function section Fc controls the screw 4 to reversely rotate (Step SN1). This consequently allows the screw 4 to be reversely rotated in the direction shown by arrow Drn at the rotation speed set by the reverse rotation setting function part Fcs. This consequently promotes the refluxing, to the screw body part 4m side, of a part of the resin R that exists at the screw head portion 4s side and that is accumulated at the front side of the screw head portion 4s the screw body part 4m (Step SN2). Specifically, the reverse rotation of the screw body part 4m provides an action to move the resin R in the rearward direction. Thus, a predetermined amount of the reflux resin Rm to be used as a part of the resin R accumulated at the front side of the screw head portion 4s is returned as a backflow to the screw body part 4m through the reflux path 11 . . . in the screw head portion 4s to promote the refluxing.

Then, after the elapse of the period set by the reverse rotation setting function part Fcs (refluxing time), the reverse rotation control is stopped (Steps SN3 and SN4). On the other hand, the metal mold 2 side has the mold clearance Lm caused by the injection and filling. After the injection step, the solidification of the resin R is promoted with the elapse of time. This solidification causes the natural compression of the resin R for example as in the processing (behavior) of the first Example (Steps S5, S6, S7 . . . ).

Thus, the injection molding method using the injection molding machine M according to the second Example allows the partial reflux injection function part 5 to provide an action (function) similar to that of the first Example. Thus, the basic effect as in the first Example can be obtained and the promotion of the reflux action can be provided, which is superior to the first Example.

Figure 11:
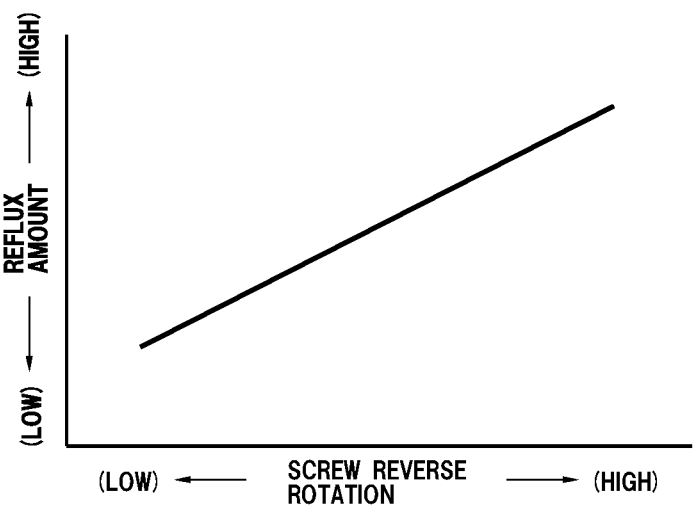
FIG. 11 illustrates the relation between the screw reverse rotation and the reflux amount when the injection molding machine is used.

FIG. 11 illustrates the relation between the screw rotation and the reflux amount when the injection molding method of the injection molding machine M in the second Example is used. As described above, the second Example can provide the promotion of the refluxing of the reflux resin Rm and the quantitative control. Thus, the reflux amount can be arbitrarily controlled, including the proportional relation between the screw rotation and the reflux amount for example.

Figure 12:
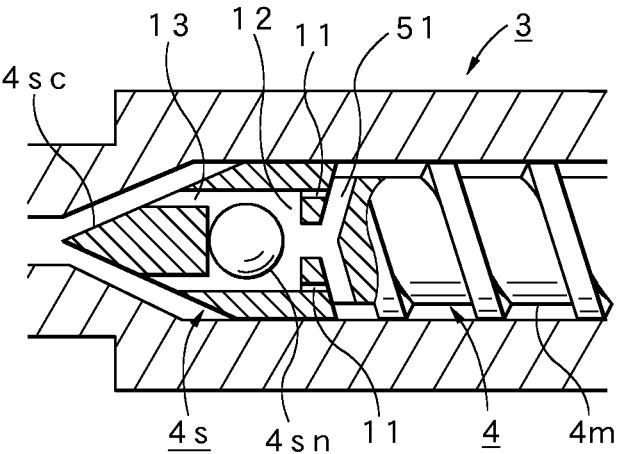
FIG. 12 is a cross-sectional side view illustrating a part of the injection apparatus (section A shown by the virtual line circle in FIG. 1) according to a modification example of the first Example of the embodiment.
Figure 13:
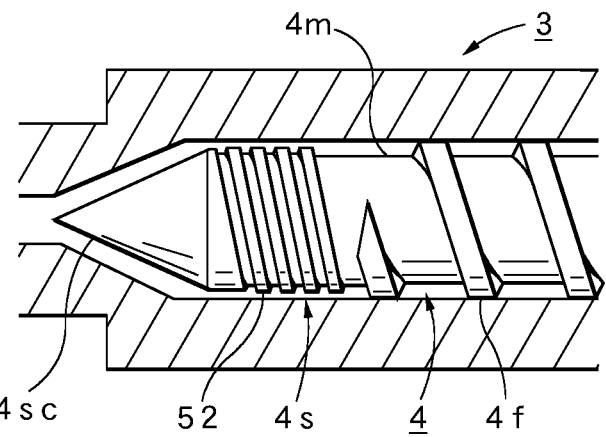
FIG. 13 is a cross-sectional side view illustrating a part of the injection apparatus (section A shown by the virtual line circle in FIG. 1) according to the modification example of the second Example of the embodiment.

FIG. 12 and FIG. 13 illustrate modification examples of the first Example and the second Example. The first Example shown in FIG. 2 illustrates the screw head portion 4s using the cylindrical check valve section 4sn. However, the screw head portion 4s also may use a ball-like check valve section 4sn as shown in FIG. 12 such as the check valve section 4sn and the screw head portion 4s having various forms including arbitrary configurations and types. In FIG. 12, the reference numeral 51 denotes a resin path. In FIG. 12, the components having the same configurations and functions as those of FIG. 2 are denoted with the same reference numerals to clarify the correspondence and will not be further described. Thus, FIG. 12 is a modification example of the first Example in which the basic configuration of the injection molding machine M and the basic processing procedure of the injection molding method are the same as those of the above-described first Example.

The injection molding machine M according to the present invention can be applied even to the screw head portion 4s not including the check valve section 4sn as shown in FIG. 13, regardless of whether the existence or nonexistence of the check valve section 4sn. In FIG. 13, the reference numeral 52 denotes a flight section. In FIG. 13, the components having the same configurations and functions as those of FIG. 9 are denoted with the same reference numeral to clarify the correspondence and will not be further described. Thus, FIG. 13 is a modification example of the first Example or the second Example. The basic configuration of the injection molding machine M and the basic processing procedure of the injection molding method are the same as those of the first Example or the second Example described above.

Third Embodiment

Next, the following section will describe the configuration of the injection molding machine M according to the third Example with reference to FIG. 14-FIG. 22. The third Example is the injection molding machine M according to the second embodiment of the present invention.

In the first Example or the second Example including the above-described modification example, the injection molding machine M was shown in which the "injection step" and the "reflux step" were simultaneously performed. In the third Example however, the injection molding machine M is shown in which the completion of the "injection step" is followed by the "reflux step" that is independently performed.

The third Example has a control function that sequentially performs: a plasticization step WiT to allow the molding machine controller C to control the injection apparatus Mi during molding to rotate the screw 4 in the heating cylinder 3 to thereby subject the resin in the heating cylinder 3 to a plasticization processing; an injection step Wi2 to allow, after the completion of the plasticization step Wi1, the screw 4 to move forward to thereby inject, into the metal mold 2, a part of the resin R plasticized and accumulated at the front side of the screw head portion 4s in the screw 4 into the metal mold 2 to fill the metal mold 2 with the resin; and a plasticization promotion step Wi3 to allow, after the completion of the injection step Wi2, a part of the remaining part of the plasticized and accumulated resin R to be refluxed as the reflux resin Rm to the rear side of the screw head portion 4s.

In order to do this, the molding machine controller C stores therein software to realize: a function to reflux the resin R plasticized and accumulated in the plasticization promotion step Wi3 (i.e., a part of the resin R accumulated at the front side of the screw head portion 4s (the reflux resin Rm) is allowed by an additional control of the screw 4 to return to the rear side of the screw head portion 4s as a backflow) (specifically, the pressurization control function to control the pressurization of the front side of the screw 4 or the reverse rotation control function to control of the reverse rotation of the screw 4).

In this case, the pressurization control function is based on a reflux method according to which the pressurization control is provided to increase the pressurization to the front side of the screw 4 to thereby cause the resin R to return to the rear side as a backflow. According to the pressurization control function, the pressure of the resin R accumulated at the front side of the screw head portion 4s is increased to a magnitude required for the refluxing after the resin R in the metal mold 2 is sufficiently solidified (after the gate sealing) or after the completion of the injection step Wi2 followed by the completion of the cooling step for example. Thus, this function can be carried out by allowing the screw head portion 4s to include therein a slight reflux path in which no reflex is caused depending on the molding injection pressure Pi or by providing a reflux path having an open/close function for example. Thus, the amount of resin to be refluxed (reflux resin amount) can be achieved relatively easily by an increase or decrease of the pressurization or the setting of the pressurization.

The reverse rotation control function on the other hand is based on a reflux method according to which the screw 4 is reversely rotated to thereby return the resin R to the rear side. The reverse rotation control function is basically used together with the above-described pressurization control function. The reverse rotation control function can adjust the reflux amount by the control to reversely rotate the screw 4. Thus, the reflux resin amount can be set more easily by selecting conditions such as the reverse rotation period and the rotation speed. An arbitrary reflux amount can be easily and accurately set by changing the period within which the screw 4 is reversely rotated and the rotation speed for example. Any of the pressurization control function and the reverse rotation control function also may be selectively used.

Next, the following section will describe the molding procedure based on the injection molding method using the injection molding machine M according to the third Example with reference to FIG. 1 and FIG. 14-FIG. 20.

First, the previous setting of the above-described specific molding mode is performed. The basic molding procedure of the specific molding mode is the same as the procedure already suggested by the applicant in Patent Publication 1 (International Publication WO2011/161899) described above. Specifically, the molding procedure can be performed as in the above-described first Example.

First, the injection pressure as an injection condition at the injection apparatus Mi side is initially set by the molding machine controller body 42c. This injection pressure can be set based on the capability of the injection apparatus Mi (driving force). The clamping force as a clamping condition at the clamping apparatus Mc side is initially set by the molding machine controller body 42c. The clamping force can be set based on the capability of the clamping apparatus Mc (driving force).

Next, the initially-set injection pressure is subjected to the optimization processing to thereby calculate the molding injection pressure Pi used for production. The initially-set clamping force is subjected to the optimization processing to thereby calculate the molding clamping force Pc used for production. The clamping force and the injection pressure are optimized in the manner as described below. First, a test molding is performed using the initially-set clamping force and injection pressure. When the clamping force is set to be slightly higher, a defective or slightly-defective tendency is caused with regard to sink, warpage, and a degassed state. Then, the magnitude of the clamping force and the magnitude of the injection pressure are changed in a stepwise manner and the test molding is performed at each magnitude to thereby allow a mold clearance sensor (e.g., a reflection optical sensor or the like) (not shown) to obtain the magnitude of the mold clearance Lm between the stationary mold 2c and the movable mold 2m. The obtained magnitude is displayed on a waveform display section on the screen of the display 42d while the acceptability of the molded item is observed.

Figure 14:
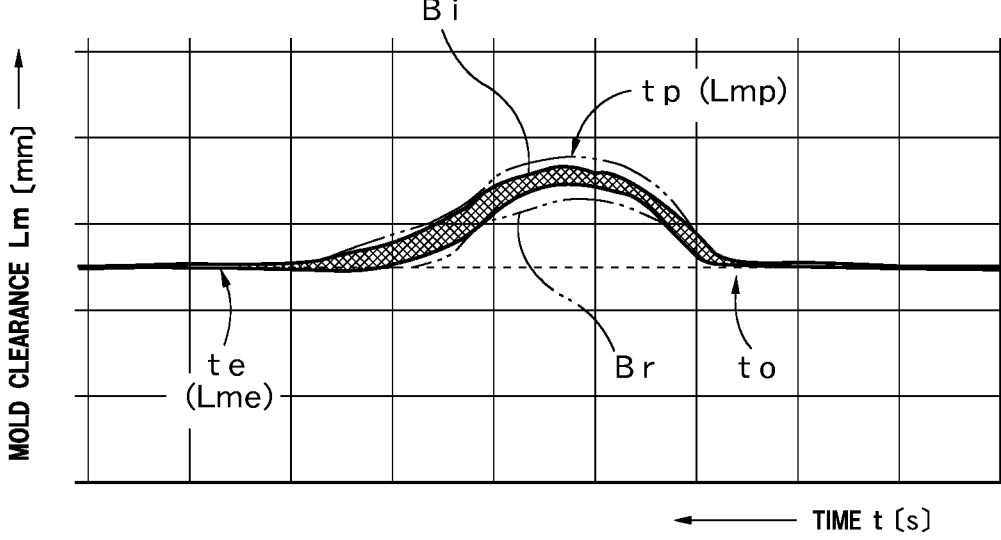
FIG. 14 illustrates the relation between time and the mold clearance in the injection step based on the injection molding method using the injection molding machine according to the third Example of the embodiment.

FIG. 14 illustrates the data of the change of the mold clearance Lm displayed on the waveform display section. FIG. 14 illustrates the range (band) between the maximum value and the minimum value during 30 molding shots. In this case, the basic change is as shown in FIG. 14 in which the metal mold 2 starts opening at the time "to" after the start of the injection and the maximum mold clearance Lmp is caused at the time "tp". Thereafter, the mold clearance Lm gradually declines. Finally, the residual mold clearance Line settles and becomes stable.

Then, the molding injection pressure Pi is obtained based on the optimization of the injection pressure so that the movable mold 2m and the stationary mold 2c have therebetween the above-described predetermined mold clearance Lm (about 0.03-0.30 [mm]) during injection and filling and a non-defective molding is possible. Specifically, the injection pressure is also appropriately changed and such a magnitude is selected that is just before the timing at which the metal mold 2 cannot be correctly filled with the resin R. The calculated molding injection pressure Pi is set as the limiter pressure Ps to the injection pressure during production. On the other hand, these test moldings repeated with different conditions can provide a clamping force selected to satisfy the above-described conditions. The selected clamping force is set as the molding clamping force Pc used when a clamping operation is performed by the metal mold 2 during production. In this case, the magnitudes of the clamping force and the injection pressure may be arbitrarily set by an operator or may be automatically or semiautomatically calculated using an auto tuning function for example provided in the injection molding machine M.

Figure 15:
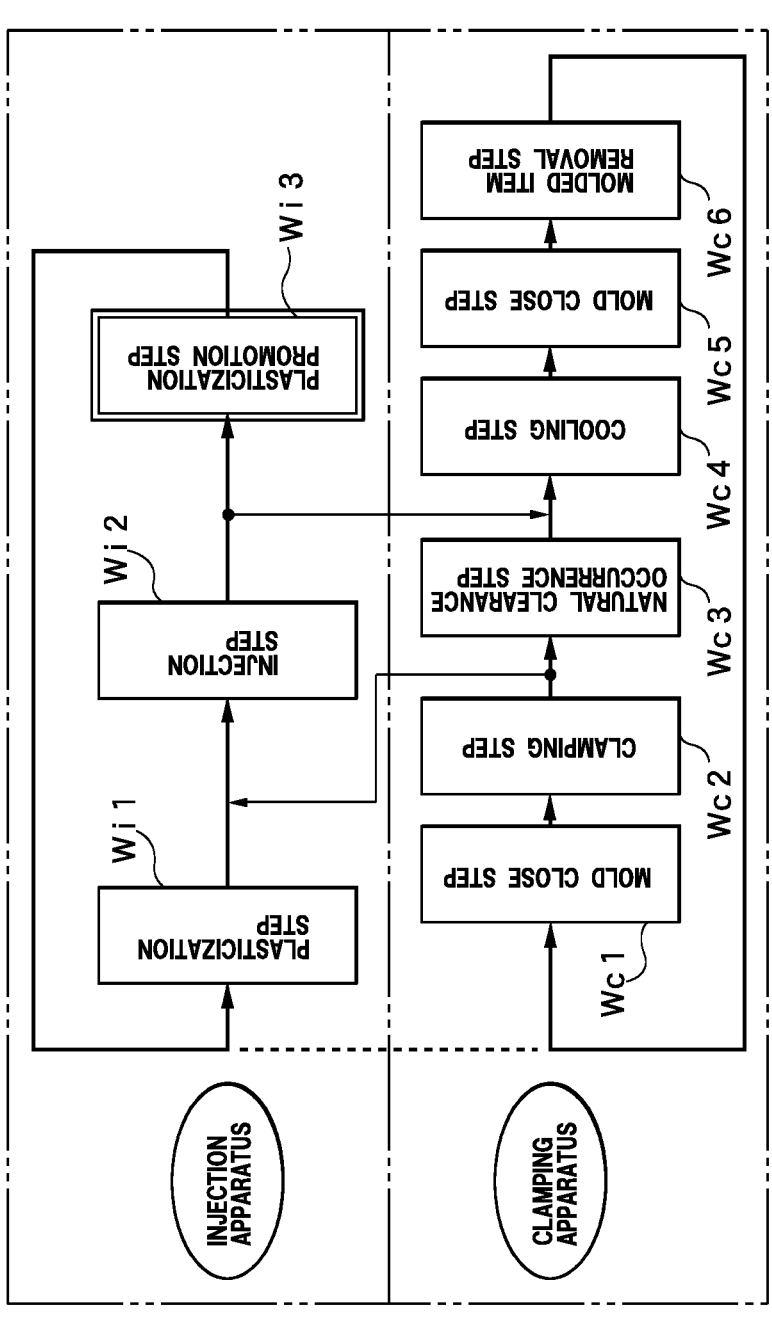
FIG. 15 illustrates, by blocks, the respective steps based on the injection molding method using the injection molding machine.
Figure 16:
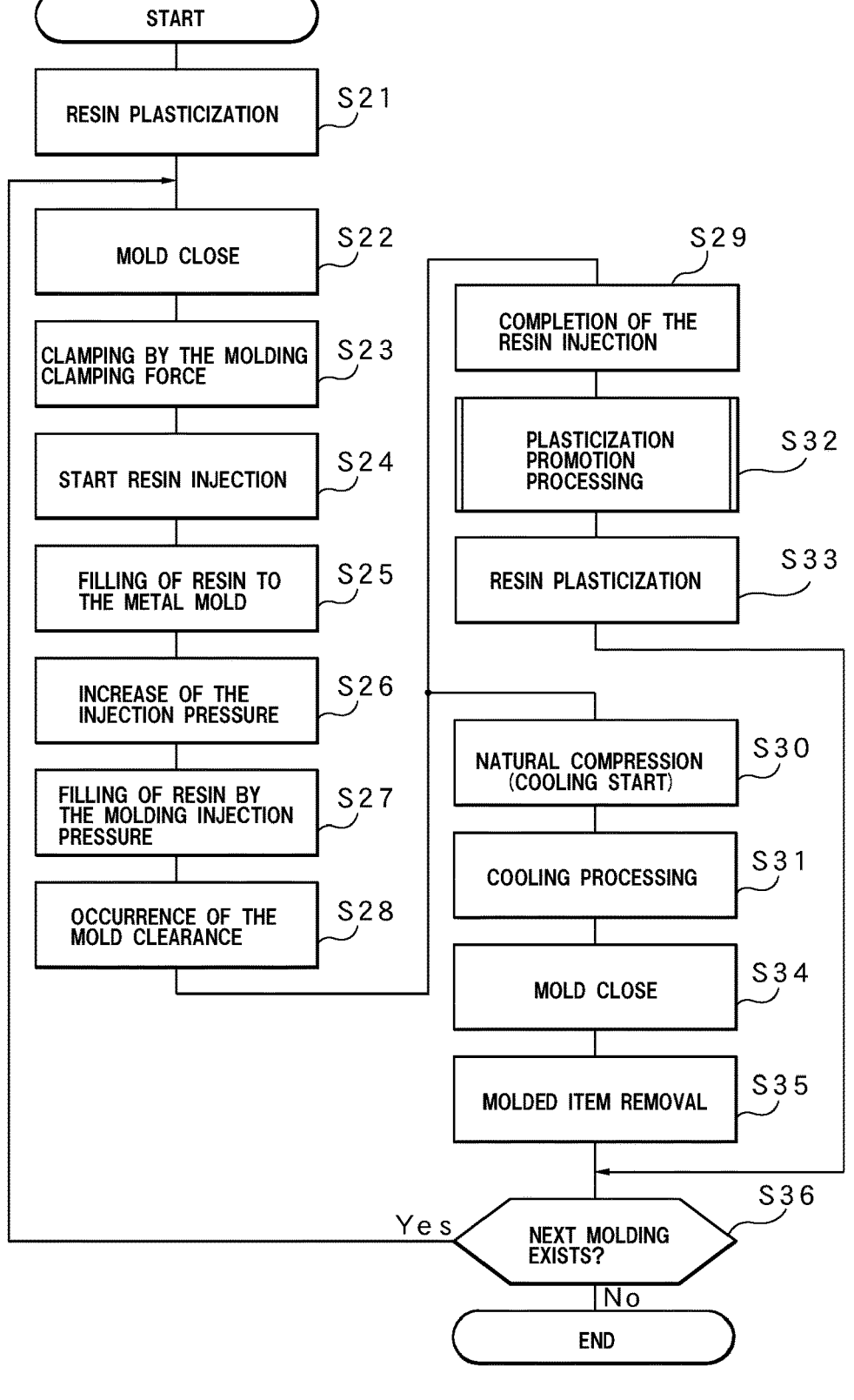
FIG. 16 is a flowchart illustrating the molding procedure based on the injection molding method using the injection molding machine.
Figure 17:
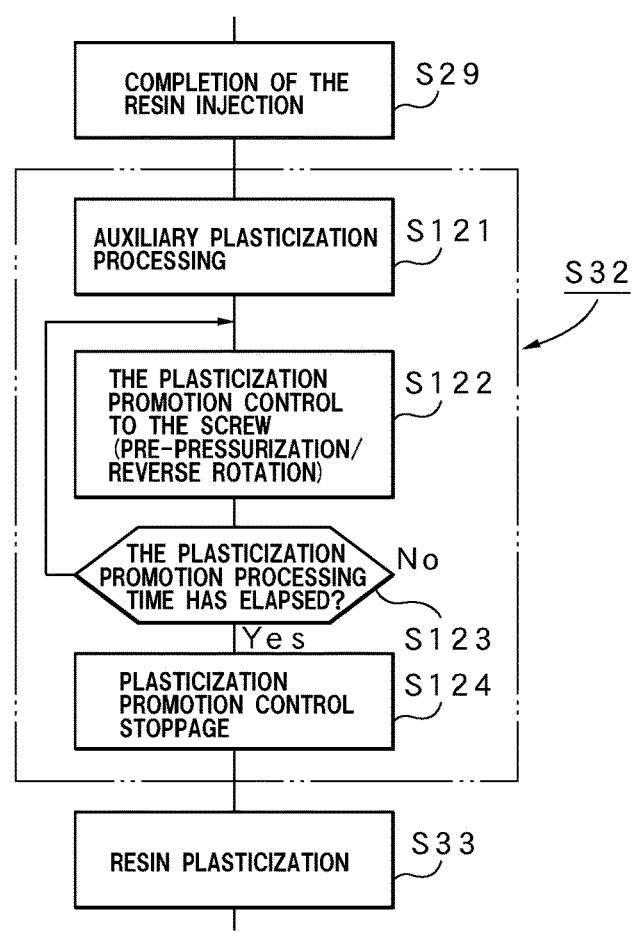
FIG. 17 is a flowchart illustrating the details of the processing of Step S30 in the flowchart of FIG. 16.

Next, the following section will describe a specific processing procedure during production with reference to the respective drawings and based on the process chart shown in FIG. 15 and the flowchart shown in FIG. 16 (FIG. 17).

During production, the resin (material) is firstly subjected to the plasticization processing (Step S21). The step of performing the plasticization processing is the plasticization step Wi1 shown in FIG. 15. In the plasticization step Wi1, the hydraulic pump 36 is controlled and the valve circuit 37 is switched to thereby drive the metering motor 25 of the injection apparatus Mi to rotate.

As a result, the screw 4 shown in FIG. 9 is positively rotated at the set rotation speed and for the set period. The positive rotation of the screw 4 causes the resin R to move forward. Thus, the resin R close to the screw body part 4m is accumulated through the screw head section 4s in the plasticization processing during which the resin R is moved from the screw body part 4m to the front side to thereby move the check valve section 4sn to the front open position. Thus, the resin R close to the screw body part 4m reaches the front side of the conical tip end section 4sc through the resin path 12 at the inner side of the check valve section 4sn and the resin path 13 . . . of the conical tip end section 4sc. As a result, the resin R subjected to the plasticization processing is gradually accumulated as plasticized resin R in the heating cylinder 3 at the front side of the conical tip end section 4sc. This accumulation causes the screw 4 to move to the rear side.

The specific molding mode does not require the measuring step as in the molding method using the general molding mode to accurately measure the resin R. Specifically, the injection processing of the specific molding mode can be achieved only by performing the injection operation until the cavity is filled with the resin R, thus only requiring the plasticization step to subject a slightly-higher amount of the resin R to the plasticization processing. In other words, the measuring operation of the general measuring step is performed but the measurement control to obtain an accurate measurement value is unnecessary.

Figure 18:
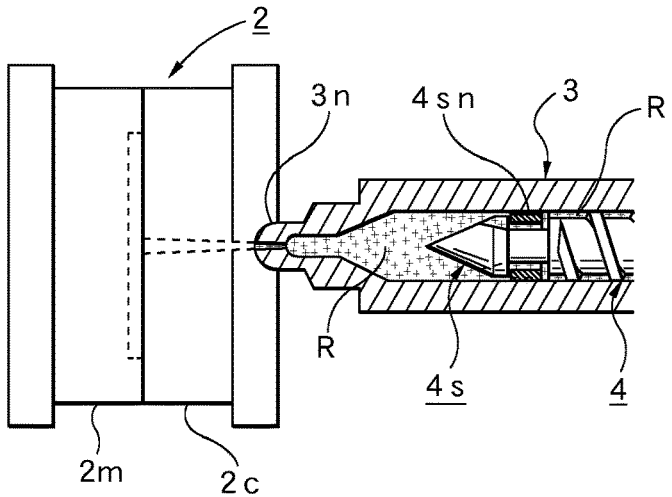
FIG. 18 illustrates the states of the metal mold and the injection apparatus in the clamping step based on the injection molding method using the injection molding machine.

Next, the hydraulic pump 36 is controlled and the valve circuit 37 is switched to thereby drive the clamping cylinder 27 of the clamping apparatus Mc to move the movable mold 2m in the mold close direction (Step S22). This operation is the mold close step Wc1 shown in FIG. 15. When the metal mold 2 is fully closed, the metal mold 2 is subjected to the clamping processing so that the molding clamping force Pc is reached (Step S23). This operation is the clamping step Wc2 shown in FIG. 15. FIG. 18 shows this state.

Thereafter, the valve circuit 37 is switched and the hydraulic pump 36 is controlled to thereby drive the injection cylinder 24 of the injection apparatus Mi to start the injection processing to inject the resin R into the metal mold 2 (Step S24), thereby performing the injection step Wi2 shown in FIG. 15. In this case, the screw 4 may be moved forward by a rated operation, thus eliminating the need to subject the screw 4 to a speed control and a pressure control. When the injection is started, the cavity of the metal mold 2 is filled with the plasticized molten resin R in the heating cylinder 3 sent through the injection nozzle 3n (Step S25).

The cavity of the metal mold 2 filled with the resin R causes an increase of the injection pressure (Step S26). Thereafter, when the injection pressure reaches the limiter pressure Ps, a control to maintain the limiter pressure Ps (i.e., a control to prevent overshooting) is performed to maintain (or limit) the injection pressure at the limiter pressure Ps (Step S27). Thus, the injection operation provides substantially one pressure control.

Figure 19:
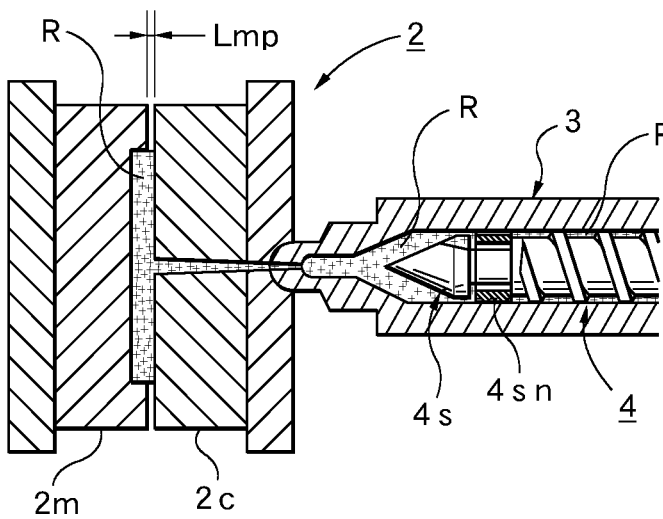
FIG. 19 is a schematic view illustrating the states of the metal mold and the injection apparatus in a natural clearance occurrence step based on the injection molding method using the injection molding machine.

Furthermore, the cavity of the metal mold 2 filled with the resin R causes the metal mold 2 to be pressurized by the resin R to thereby allow the stationary mold 2c and the movable mold 2m the mold clearance Lm that changes as shown in FIG. 14 (Step S28). Specifically, the natural clearance occurrence step Wc3 shown in FIG. 15 is caused. This mold clearance Lm is generated based on the molding clamping force Pc and the molding injection pressure Pi set in advance. This state is shown in FIG. 19. FIG. 19 illustrates an image in which the maximum mold clearance Lmp is generated as the mold clearance Lm. Thereafter, after the elapse of the injection time since the start of the injection, this means the completion of the injection and filling operation of the resin R into the metal mold 2. Specifically, the injection step Wi2 is completed (Step S29).

Figure 20:
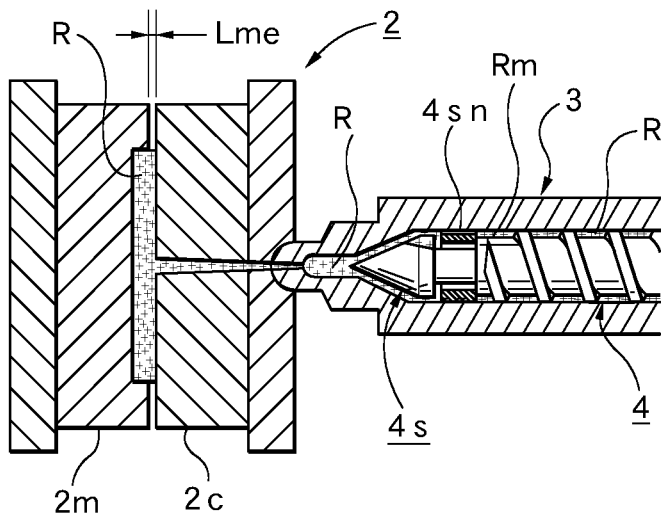
FIG. 20 is a schematic view illustrating the states of the metal mold and the injection apparatus in another natural clearance occurrence step based on the injection molding method using the injection molding machine.

The metal mold 2 side proceeds to a cooling step Wc4 to perform a cooling processing for a cooling time set in advance. In the cooling step Wc4 (FIG. 15), the solidification of the resin R is promoted with the elapse of time and this solidification proportionally causes the natural compression of the resin R (Steps S30 and S31). Specifically, the solidification of the resin R causes a decreased capacity. In accordance with the decrease of the capacity, the pressurization action by the elastic return of the metal mold 2 (the movable mold 2m in particular) causes a natural compression. This state is shown in FIG. 20. FIG. 20 illustrates an image in which the residual mold clearance Line is generated as the mold clearance Lm.

On the other hand, after the completion of the injection step Wi2, the plasticization promotion step Wi3 shown in FIG. 15 is carried out at the timing set in advance (Step S32). In this case, when the injection step Wi2 is completed or when the cooling step Wc4 is started, the resin (material) is firstly subjected to an auxiliary plasticization processing for a predetermined auxiliary plasticization time T1 set in advance (Step S121). The reason is that, when the injection step is completed, the plasticized resin R is accumulated at the front side of the screw 4 in a small amount. Thus, the auxiliary plasticization processing performed for the auxiliary plasticization time T1 secures the reflux amount. The auxiliary plasticization processing may be performed on the amount (the entire amount) in the plasticization step Wi1 or may be performed on a part thereof. The auxiliary plasticization time T1 may be set depending on a predetermined auxiliary plasticization position to the screw 4.

This auxiliary plasticization processing is desirably set to be long enough so that the resin R in the metal mold 2 (including a gate for example) is solidified to a certain level and the resin R is prevented from flowing in the forward direction even when the pressurization control function applies a high pressure to the screw 4 in the forward direction or no influence is caused on the resin R (molded item) in the metal mold 2 even when the reverse rotation control function controls the screw 4 to reversely rotate.

After the completion of the auxiliary plasticization processing, the plasticization promotion step Wi3 is substantially performed. Specifically, the screw 3 is subjected to the above-described reverse rotation control function and/or the pressurization control function (Step S122). In this case, the pressurization control function provides a control to drive the injection cylinder 24 to apply a forward pressure to the screw 4. This applied pressure is set, as described above, to be higher than the molding injection pressure Pi (the limiter pressure Ps), thus providing a rearward refluxing. The pressure application is started at a timing as described above at which the resin R is prevented from forwardly flow even when receiving a high pressure in the forward direction (i.e., at the start of the cooling step Wc4 to provide a gate seal at least in the metal mold 2) so that no influence is caused on the molded item (resin R).

As a result, the accumulated plasticized resin R is refluxed to the rear side of the screw head portion 4s through the clearance between the screw head portion 4s and the heating cylinder 3. Then, the reflux resin Rm returned to the rear side of the screw head portion 4s as a backflow is added to the resin R closed to the screw body part 4m and is mixed therewith. Thereafter, after the elapse of the plasticization promotion processing time T2, the plasticization promotion control (pressurization control) is stopped (Steps S123 and S124). Specifically, the plasticization promotion step Wi3 using the pressurization control function is completed.

Thus, the plasticization promotion processing time T2 and the pressurization when using the pressurization control function are desirable to have, from the viewpoints of securing the production efficiency and the yield rate, the completion of the cooling processing and a pressure higher than the injection pressure Pi. In order to provide the pressurization control function in a more effective manner, the screw head portion 4s desirably include therein a slight reflux path to prevent refluxing depending on the molding injection pressure Pi or a reflux path having an open/close function.

On the other hand, in order to perform the reverse rotation control function, a control is performed to provide the pressurization control function and to drive the metering motor 25 to reversely rotate the screw 4 at the rotation speed set in advance (Step S122). This consequently promotes, through the screw head portion 4s, the refluxing of the plasticized resin R as a backflow to the rear side of the screw head portion 4s. Then, the reflux resin Rm returned as a backflow through the screw head portion 4s is mixed with the resin R close to the screw body part 4m at the rear side of the screw head portion 4s. Thereafter, after the elapse of the plasticization promotion processing time T2, the plasticization promotion control (reverse rotation control) is stopped (Steps S123 and S124). Specifically, the plasticization promotion step Wi3 using the reverse rotation control function is completed.

Thus, the plasticization promotion processing time T2 using the reverse rotation control function and the rotation speed of the screw 4 are desirably provided, from the viewpoint of securing the production efficiency and the yield rate, after the completion of the cooling processing and at the maximum high rotation. FIG. 20 illustrates the state in which the screw 4 is moved forward and a target reflux amount is refluxed to the rear side of the screw head portion 4s.

After the completion of the plasticization promotion step Wi3, the plasticization processing is performed in the plasticization step Wi1 (Step S33). In this case, the front side of the screw body part 4m has the resin R mixed with the reflux resin Rm (i.e., a part of the resin R subjected to the primary plasticization processing accumulated at the front side of the screw 4 is returned to the screw body part 4m as the reflux resin Rm). Thus, the resin R mixed with the reflux resin Rm is subjected to the plasticization processing. Thus, even when insufficiently-plasticized resin R and the reflux resin Rm are accumulated at the front side of the screw 4, the second plasticization processing can be performed, thus further promoting the plasticization.

On the other hand, in FIG. 16, when the cooling step Wc4 is completed at the clamping apparatus Mc side after the elapse of the set cooling time, the valve circuit 37 is switched and the hydraulic pump 36 is controlled to thereby drive the clamping cylinder 27 to rearwardly move the movable mold 2m to thereby open the mold (Step S34). This step is a mold-opening step Wc5 shown in FIG. 15. After the mold-opening operation, the ejector cylinder 31 is driven to project the molded item attached to the movable mold 2m (Step S35). This step is a molded item removal step Wc6 shown in FIG. 15. As a result, the molded item is removed and one molding cycle is completed. Thus, in order to perform the second molding, the respective processings (the respective steps) are sequentially performed in a similar manner, including the mold closing step, the clamping step, the injection step, and the cooling step (Steps S36, S22 . . . ).

FIG. 14 illustrates the relation between the time t [t] and the mold clearance Lm [mm] in the injection step Wi2 based on the injection molding method using the injection molding machine M according to the third Example. In particular, FIG. 14 illustrates data showing the change of the respective mold clearances Lm . . . when 30 molded items are molded (i.e., the range (band) between the maximum value and the minimum value during 30 molding shots). The band Bi shown by the solid line shows the case in which the injection molding machine M according to the third Example is used with reflux while the band Br shown by the virtual line shows the case in which the injection molding machine M according to the third Example is used with no reflux. In the former case with reflux, the mold clearance Lm . . . shows a small dispersion and the behavior is stable. In the latter case with no reflux, the mold clearance Lm . . . shows a large dispersion and the behavior is unstable. This means that the resin R subjected to the plasticization processing has an improved homogenization and the resultant molded item shows a yield rate proportionally improved in accordance with improved homogenization.

According to the injection molding method using the injection molding machine M according to the third Example, the relation between the screw reverse rotation and the reflux amount is also similar to the above-described one shown in FIG. 11. Thus, the use of the injection molding machine M according to the third Example can provide the promotion of the refluxing of the resin R and the quantitative control, thus providing an arbitrary control of the reflux amount, including the proportional relation between the screw reverse rotation amount and the reflux amount for example.

Figure 21:
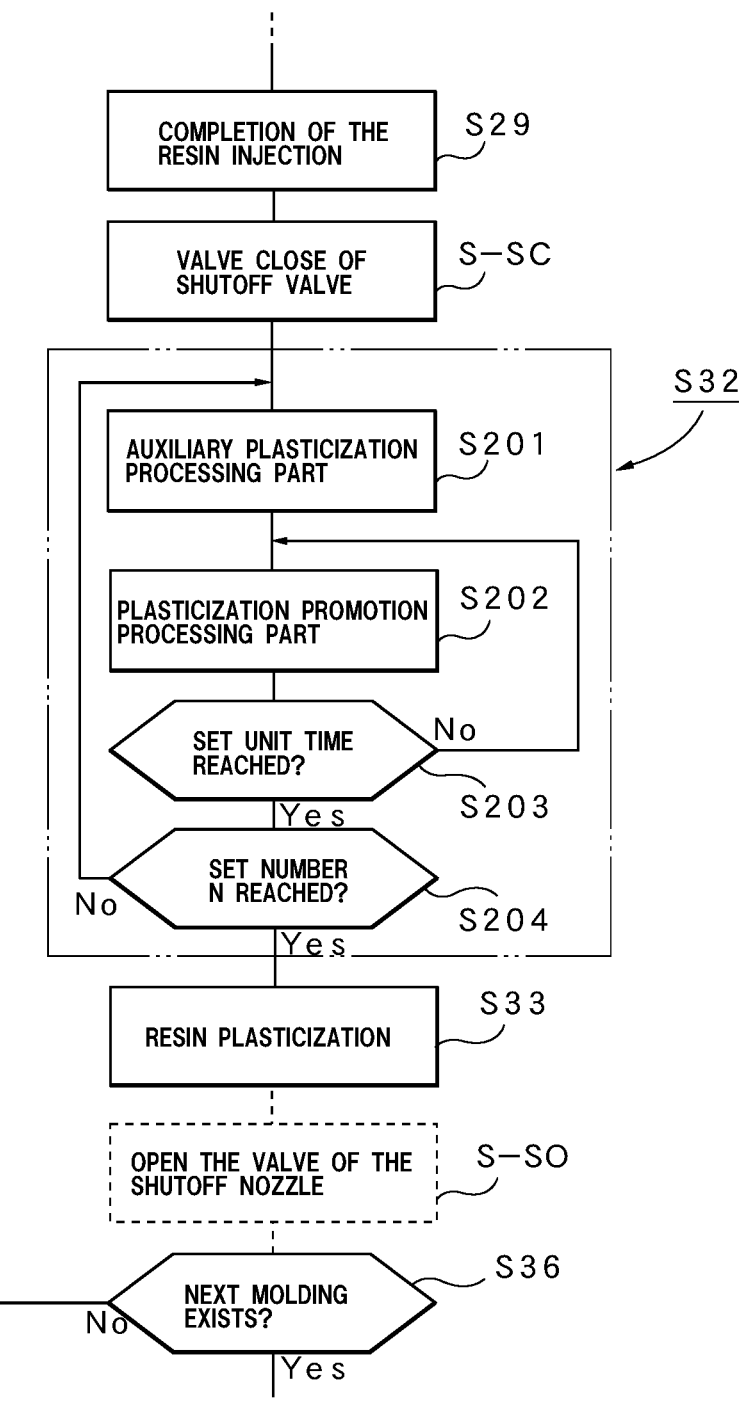
FIG. 21 illustrates the details of the processing of Step S30 in the flowchart of FIG. 17 in a modification example of the third Example.
Figure 22:
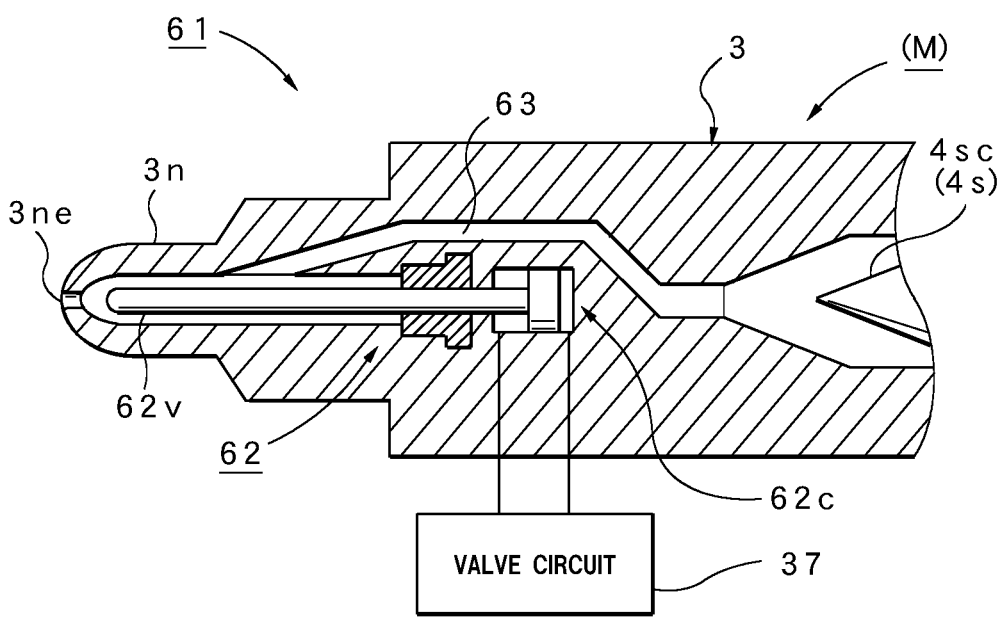
FIG. 22 is a schematic view illustrating the configuration of a shutoff nozzle of the injection molding machine according to the modification example.

Next, the following section will describe the molding method using the injection molding machine M according to the modification example of the third Example with reference to FIG. 21 and FIG. 22.

This modification example uses the injection molding machine M (injection apparatus Mi) including the shutoff nozzle 61 shown in FIG. 22. The illustrated shutoff nozzle 61 has a known structure. In FIG. 22, the reference numeral 37 denotes the valve circuit shown in FIG. 1 and the reference numeral 62 denotes a shutoff valve that opens or closes, in accordance with the switching of the valve circuit 37, a nozzle opening 3*ne* at the tip end of the injection nozzle 3*n*. The reference numeral 62*v* denotes a shaft-like valve body. The reference numeral 62*c* denotes a driving cylinder to displace the valve body 62*v* in the forward or rearward direction in the opening direction (rear) or the closing direction (forward). The reference numeral 63 denotes a resin path. The same components as the above-described ones of FIG. 9 are denoted with the same reference numeral to clarify the correspondence and will not be further described.

The use of the shutoff nozzle 61 as described above allows the nozzle opening 3*ne* to be shut off as required, thus providing the plasticization promotion step Wi3 even during the cooling step Wc4, the mold-opening step Wc5, and the molded item removal step Wc6. This can consequently provide the plasticization promotion processing for a sufficiently-long period, thus performing the injection molding method the using injection molding machine M according to the present invention in a more secure and favorable manner.

Although the above section showed a case where the shutoff nozzle 61 is used, various other nozzle structures having a similar function also can be used, including a valve nozzle.

FIG. 21 illustrates the flowchart illustrating the processing procedure of the injection molding method according to the modified embodiment, specifically showing Step S32 in the flowchart shown in FIG. 16. The modification example is basically performed based on the processing procedure as in the flowchart shown in FIG. 16, except for the processing details of Step S32.

The modification example sets in advance the auxiliary plasticization processing part to perform the auxiliary plasticization processing and the plasticization promotion processing part to perform the plasticization promotion processing described above in FIG. 17. In this case, the auxiliary plasticization processing part sets the unit time to perform the auxiliary plasticization processing as a predetermined auxiliary plasticization time T1*e*. The plasticization promotion processing part sets the unit time to perform the plasticization promotion processing as a predetermined plasticization promotion processing time T2*e*.

Now, a case is assumed in which the "Step S29" shown in FIG. 16 (FIG. 21) is completed. In the modification example, the shutoff valve 62 is driven-controlled based on this to switch the valve 62 to the close side (Step S-SC). Specifically, in this case, the valve body 62*v* is moved forward to shut off the nozzle opening 3*ne*.

Next, the auxiliary plasticization processing part is performed to perform the auxiliary plasticization processing in FIG. 17 described above for the auxiliary plasticization time T1*e* (Step S201). After the elapse of the auxiliary plasticization time T1*e* and the completion of the auxiliary plasticization processing part, the plasticization promotion processing part is performed to perform the plasticization promotion processing for the plasticization promotion processing time T2*e* (Steps S202 and S203). Then, a step using the combination of the auxiliary plasticization processing part and the plasticization promotion processing part is repeated for the number N set in advance (Steps S204 and S201 . . . ).

The step using the above combination can be realized by using the shutoff nozzle 61 to perform the plasticization promotion step Wi3 for a sufficiently-long time. This can provide not only a simple increase of the processing time of the plasticization promotion step Wi3 but also the repetition of the step using such a combination for a plurality time (N times). The number of repetitions can be set to an arbitrary number. FIG. 21 shows a case where the step using the combination is performed a plurality times (N times). However, the step also can be repeated within the time allowable in the plasticization promotion step Wi3.

This allows, when a relatively-long cooling time is required as in the case of a large molded item for example, the repeated processing as described above to be performed, thereby realizing the effective use of the cooling time. The result is that the resin R can be subjected to the plasticization processing in a more uniform and fine manner, thus contributing to molded items having a further-improved quality and an improved yield rate.

After the completion of the above plasticization promotion step Wi3, the plasticization processing is performed in the plasticization step Wi1 (Step S33). At the predetermined timing, the shutoff valve 62 is driven-controlled to switch the valve 62 to the open side (Step S-SO). This open-side position is shown in FIG. 22. Thereafter, in order to perform the next molding, the respective processings (the respective steps) are sequentially performed in a similar manner, including the mold closing step, the clamping step, the injection step, and the cooling step (Steps S36, S22, S23 . . . (see FIG. 16)).

Thus, the injection molding machine M according to the third Example including such a modification example uses a basic configuration including: the plasticization step Wi1 to rotate the screw 4 in the heating cylinder 3 during molding to thereby subject the resin in the heating cylinder 3 to a plasticization processing; the injection step Wi2 to allow, after the completion of the plasticization step WiT, the screw 4 to move forward to thereby inject a part of the plasticized resin R accumulated at the front side of the screw head portion 4s of the screw 4 into the metal mold 2 to fill the metal mold 2 with the resin; and the plasticization promotion step Wi3 as a new step to reflux, after the completion of the injection step Wi2, a part of the remaining part of the accumulated plasticized resin R to the rear side of the screw head portion 4s as the reflux resin Rm. This consequently can provide, while avoiding the negative influence on molded items, the final molded items having a further-improved yield rate and can provide in particular the injection molding machine using a new injection molding method that can further improve the yield rate having a limitation in the conventional case. As a result, large molded items and special resin molded items for example can be produced with an improved production efficiency and a reduced production cost, thus effectively contributing to the avoidance of a resource loss and a wasteful energy consumption.

In particular, the clamping apparatus Mc can be used that can provide the natural compression of the resin R at least in accordance with the solidification of the resin R in the metal mold 2. The molding injection pressure Pi providing anon-defective molding and molding clamping force Pc providing a non-defective molding are calculated and set in advance that allow the movable mold 2m and the stationary mold 2c to have therebetween a predetermined mold clearance Lm during injection and filling. The molding injection pressure Pi providing a non-defective molding and the molding clamping force Pc providing a non-defective molding are calculated and set in advance that allow, during injection and filling, the movable mold 2m and the stationary mold 2c to have therebetween the predetermined mold clearance Lm. During molding, the clamping apparatus Mc is clamped at the molding clamping force Pc and the molding injection pressure Pi is set as the limiter pressure Ps. Thus, a specific molding mode not including a measuring step, which is hardly influenced by the injection apparatus Mi-side state can use the injection molding machine according to the present invention. Thus, the improved production efficiency and the reduced production cost can be realized, thus effectively contributing to the avoidance of a resource loss and a wasteful energy consumption.

As described above, the best embodiment (the first Example—the third Example) has been described in detail. However, the present invention is not limited to such an embodiment. Arbitral change, addition, and/or deletion can be applied in the detailed configuration, material, number, numerical value, and/or method for example within scope not deviation from the concept of the present invention.

For example, the predetermined amount of the reflux resin Rm to be refluxed is desirably set within the range of 10-60[%] of the capacity of the resin R injected into the metal mold 2 to fill the metal mold 2 with the resin R. However, this range can be arbitrarily selected depending on the type of the resin R and/or the type of the molded item for example. In the above example, the partial reflux injection function part 5 is configured so that the screw head portion 4s includes at least one reflux paths 11 . . . in which the reflux resin Rm is refluxed. However, the concept of the provision of the reflux path 11 also includes the screw head portion 4s having a slightly smaller outer diameter, the heating cylinder 3 having a larger inner diameter, or the heating cylinder 3 having an inner wall partially including therein a groove for example. The injection pressure additional setting function part Fs is not an essential element. For example, the injection pressure additional setting function part Fs is not always required depending on the form of the reflux path 11 . . . The predetermined amount of the to-be-refluxed resin Rm may be refluxed to the screw body part 4m through the inner side of the screw head portion 4s, through the outer periphery side of the screw head portion 4s, or through both of the inner side of the screw head portion 4s and the outer periphery side of the screw head portion 4s. The invention is optimally used for a case where a specific molding mode is used. However, the invention also can be applied to the injection molding machine M and the injection molding method using a general molding mode. The injection molding machine M may be a hydraulic injection molding machine or an electric injection molding machine and may be used with an arbitrary driving method.

On the other hand, in the embodiment, the clamping apparatus Mc can provide the natural compression of the resin R at least in accordance with the solidification of the resin R in the metal mold 2. The invention is optimally used for the case where the specific molding mode is used in which the molding injection pressure Pi providing a non-defective molding and the molding clamping force Pc providing a non-defective molding are calculated and set in advance that allow the movable mold 2m and the stationary mold 2c to have therebetween the predetermined mold clearance Lm during injection and filling. The clamping apparatus Mc is clamped at the molding clamping force Pc during molding and the molding injection pressure Pi is set as the limiter pressure Ps. However, the invention also can be applied to the injection molding machine M and the injection molding method using a general molding mode. The injection molding machine M may be a hydraulic injection molding machine or may be an electric injection molding machine and may be used with an arbitrary driving method. The pressurization control function and the reverse rotation control function were shown as a function in the plasticization promotion step Wi3 to reflux the accumulated plasticized resin R. However, other functions also may be used to reflux the resin R. A specific method to provide the pressurization control function and the reverse rotation control function is not limited to the illustrated method and other methods providing similar functions also may be used.

The present invention can be used for various injection molding machines to inject resin, with a predetermined injection pressure, to a metal mold clamped by a predetermined clamping force to fill the mold with the resin for a molding purpose.

The invention claimed is:

1. An injection molding machine, comprising:
    a clamping apparatus for clamping a metal mold comprising a stationary mold and a movable mold with a predetermined clamping force;
    an injection apparatus for injecting resin to the metal mold with a predetermined injection pressure to fill the metal mold with the resin; and
    a molding machine controller for controlling the clamping apparatus and the injection apparatus,
    wherein the molding machine controller is configured to:

move a screw accommodated in a heating cylinder of the injection apparatus forward so that the resin at a front side of a screw head portion at a front end of the screw is injected into the metal mold to fill the metal mold with the resin, and after injecting the resin into the metal mold is complete, refluxing a predetermined amount of resin at the front side of the screw to a screw body part side at a rear side of the screw head portion as reflux resin through an interior side of the screw head portion and/or an outer periphery side of the screw head portion, and wherein the clamping apparatus provides a natural compression of the resin at least in accordance with a solidification of the resin in the metal mold and the molding machine controller includes a control function according to which a molding injection pressure providing a non-defective molding and a molding clamping force providing a non-defective molding calculated and set in advance to allow the movable mold and the stationary mold to have therebetween a predetermined mold clearance during injection and filling and the clamping apparatus is clamped with the molding clamping force during molding and the molding injection pressure is set as a limiter pressure to thereby drive the injection apparatus to inject the resin into the metal mold to fill the metal mold with the resin.

2. The injection molding machine according to claim 1, wherein the predetermined amount is selected to be within a range of 10-60% of a capacity of the resin injected into the metal mold to fill the metal mold with the resin.

3. The injection molding machine according to claim 2, wherein the screw head portion includes at least one reflux path in which the resin is refluxed.

4. The injection molding machine according to claim 2, wherein the molding machine controller is further configured to reversely rotate the screw.

5. The injection molding machine according to claim 1, wherein the screw head portion includes at least one reflux path in which the resin is refluxed.

6. The injection molding machine according to claim 5, wherein the molding machine controller is further configured to set the injection pressure during molding to be higher, by a predetermined magnitude, than the injection pressure with no reflux of the resin.

7. The injection molding machine according to claim 1, wherein the molding machine controller is further configured to reversely rotate the screw.

8. The injection molding machine according to claim 7, wherein the molding machine controller is further configured to set a period within which the screw is reversely rotated and a rotation speed.

9. An injection molding machine, comprising:

a clamping apparatus for clamping a metal mold comprising a stationary mold and a movable mold with a predetermined clamping force;

an injection apparatus for injecting resin to a clamped metal mold with a predetermined injection pressure to fill the metal mold with the resin; and a molding machine controller for controlling the clamping apparatus and the injection apparatus, wherein the injection molding machine includes a molding machine controller for sequentially performing:

a plasticization step for allowing a screw accommodated in a heating cylinder of the injection apparatus to move forward to thereby inject, into the metal mold, the resin at a front side of a screw head portion at a front end of the screw to fill the metal mold with the resin and to allow a predetermined amount of resin to be used as a part of the resin to be refluxed as reflux resin to a screw body part side at a rear side of the screw head portion by allowing the screw in the heating cylinder to rotate to thereby subject the resin in the heating cylinder to a plasticization processing;

an injection step of allowing, after completion of the plasticization step, the screw to move forward to thereby inject, into the metal mold, a part of the plasticized resin accumulated at the front side of the screw head portion of the screw to fill the metal mold with the resin; and a plasticization promotion step to allow, after the completion of the injection step, a part of a remaining part of the resin to be refluxed to the rear side of the screw head portion as reflux resin, wherein the clamping apparatus provides a natural compression of the resin at least in accordance with a solidification of the resin in the metal mold and the molding machine controller includes a control function according to which a molding injection pressure providing a non-defective molding and a molding clamping force providing a non-defective molding are calculated and set in advance to allow the movable mold and the stationary mold to have therebetween a predetermined mold clearance during injection and filling and the clamping apparatus is clamped with the molding clamping force during molding and the molding injection pressure is set as a limiter pressure to thereby drive the injection apparatus to inject the resin into the metal mold to fill the metal mold with the resin.

10. The injection molding machine according to claim 9, wherein the injection apparatus includes a shutoff nozzle or a valve nozzle.

11. The injection molding machine according to claim 9, wherein the plasticization promotion step subjects the screw to a front-side pressurization control function to thereby reflux the accumulated plasticized resin.

12. The injection molding machine according to claim 9, wherein the plasticization promotion step subjects the screw to a reverse rotation control function to thereby reflux the accumulated plasticized resin.

13. The injection molding machine according to claim 9, wherein the plasticization promotion step performs, a plasticization promotion processing is substantially performed, an auxiliary plasticization processing for securing an amount of the reflux resin.

14. The injection molding machine according to claim 13, wherein the plasticization promotion step sets an auxiliary plasticization processing part for performing the auxiliary plasticization processing and a plasticization promotion processing part for performing the plasticization promotion processing and a step of a combination of the auxiliary plasticization processing part and the plasticization promotion processing part based on this setting is repeatedly performed a number N set in advance or for a time allowable in the plasticization promotion step.

* * * * *